United States Patent
Caudle

(10) Patent No.: US 12,129,779 B2
(45) Date of Patent: Oct. 29, 2024

(54) LEAN NO$_X$ TRAP PLUS LOW TEMPERATURE NO$_X$ ADSORBER SYSTEM FOR LOW TEMPERATURE NO$_X$ TRAPPING

(71) Applicant: BASF CORPORATION, Florham Park, NJ (US)

(72) Inventor: Matthew T. Caudle, Hamilton, NJ (US)

(73) Assignee: BASF Corporation

( * ) Notice: Subject to any disclaimer, the term of this patent is extended or adjusted under 35 U.S.C. 154(b) by 0 days.

(21) Appl. No.: 17/757,080

(22) PCT Filed: Dec. 10, 2020

(86) PCT No.: PCT/US2020/064257
§ 371 (c)(1),
(2) Date: Jun. 9, 2022

(87) PCT Pub. No.: WO2021/119279
PCT Pub. Date: Jun. 17, 2021

(65) Prior Publication Data
US 2023/0003150 A1   Jan. 5, 2023

Related U.S. Application Data

(60) Provisional application No. 62/947,780, filed on Dec. 13, 2019.

(51) Int. Cl.
*F01N 3/08* (2006.01)
*F01N 3/022* (2006.01)
*F01N 3/20* (2006.01)

(52) U.S. Cl.
CPC ......... *F01N 3/0842* (2013.01); *F01N 3/0222* (2013.01); *F01N 3/0821* (2013.01);
(Continued)

(58) Field of Classification Search
CPC ........ F01N 3/0222; F01N 3/0231; F01N 3/08; F01N 3/0807; F01N 3/0814;
(Continued)

(56) References Cited

U.S. PATENT DOCUMENTS 4,961,917 A   10/1990   Byrne
5,516,497 A   5/1996   Speronello et al.
(Continued)

FOREIGN PATENT DOCUMENTS

DE   102016118808 A1   4/2017
FR   3007793 A1   1/2015
(Continued)

OTHER PUBLICATIONS

Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.
(Continued)

*Primary Examiner* — Binh Q Tran
(74) *Attorney, Agent, or Firm* — Ronald Stern; ECMS Global Intellectual Property

(57) ABSTRACT

The present disclosure is directed to an emission treatment system for NO$_x$ abatement in an exhaust stream of a lean burn engine. The emission treatment system includes a lean NO$_x$ trap (LNT) in fluid communication with and downstream from the lean burn engine and a low-temperature NO$_x$ adsorber (LT-NA) in fluid communication with and downstream of the LNT. Further provided is a method for abating NO$_x$ in an exhaust stream from a lean burn engine utilizing the disclosed system.

21 Claims, 8 Drawing Sheets

(52) U.S. Cl.
CPC .......... *F01N 3/2066* (2013.01); *F01N 3/0807* (2013.01); *F01N 3/0814* (2013.01); *F01N 3/0828* (2013.01); *F01N 3/0871* (2013.01); *F01N 2250/12* (2013.01); *F01N 2250/14* (2013.01); *F01N 2330/32* (2013.01); *F01N 2330/34* (2013.01); *F01N 2370/24* (2013.01); *F01N 2510/0682* (2013.01); *F01N 2550/03* (2013.01); *F01N 2560/025* (2013.01); *F01N 2560/026* (2013.01); *F01N 2570/16* (2013.01); *F01N 2900/1614* (2013.01); *F01N 2900/1624* (2013.01)

(58) Field of Classification Search
CPC .... F01N 3/0821; F01N 3/0828; F01N 3/0842; F01N 3/0864; F01N 3/0871; F01N 3/0885; F01N 3/10; F01N 3/2006; F01N 3/206; F01N 3/2066; F01N 3/208; F01N 3/20; F01N 3/2828; F01N 2240/18; F01N 2250/12; F01N 2250/14; F01N 2330/34; F01N 2370/00; F01N 2370/24; F01N 2510/0682; F01N 2550/03; F01N 2560/026; F01N 2570/14; F01N 2570/145; F01N 2610/02; F01N 2900/1612; F01N 2900/1614; F01N 2900/1621; F01N 2900/1622; F01N 2900/1624; F02D 41/027; F02D 41/0275; F02D 41/028; F02D 41/0285; F02D 41/146; F02D 2200/0806; F02D 2200/0808; F02D 2200/0811; F02D 2200/0818; B01D 53/9404; B01D 53/9409; B01D 53/9413; B01D 53/9418; B01D 53/9422; B01D 53/9427; B01D 53/9472; B01D 53/9477; B01D 2255/1021; B01D 2255/1023; B01D 2255/1025; B01D 2255/2065; B01D 2255/50; B01D 2255/502; B01D 2255/504; B01D 2255/908; B01D 2255/91; Y02T 10/12
See application file for complete search history.

(56) References Cited

U.S. PATENT DOCUMENTS

| | | | |
|---|---|---|---|
| 5,750,082 | A | 5/1998 | Hepburn et al. |
| 7,229,597 | B2 | 6/2007 | Patchett et al. |
| 8,105,559 | B2 | 1/2012 | Melville et al. |
| 8,475,752 | B2 | 7/2013 | Wan |
| 8,592,337 | B2 | 11/2013 | Hilgendorff et al. |
| 9,114,385 | B2 | 8/2015 | Brisley et al. |
| 9,486,791 | B2 | 11/2016 | Swallow et al. |
| 9,610,564 | B2 | 4/2017 | Xue et al. |
| 9,662,611 | B2 | 5/2017 | Wan et al. |
| 2002/0077247 | A1 | 6/2002 | Bender et al. |
| 2005/0028518 | A1* | 2/2005 | Li ............ F01N 3/0814 60/300 |
| 2006/0174610 | A1* | 8/2006 | Brown ........... F01N 9/005 60/285 |
| 2008/0282670 | A1* | 11/2008 | McCarthy, Jr. ....... F01N 3/0871 60/299 |
| 2009/0320457 | A1 | 12/2009 | Wan |
| 2010/0183490 | A1 | 7/2010 | Hoke et al. |
| 2011/0305615 | A1 | 12/2011 | Hilgendorff |
| 2015/0157982 | A1 | 6/2015 | Rajaram et al. |
| 2015/0158019 | A1 | 6/2015 | Rajaram et al. |
| 2016/0228852 | A1 | 8/2016 | Biberger et al. |
| 2017/0096922 | A1* | 4/2017 | Bergeal ............ F01N 3/0842 |
| 2017/0211455 | A1 | 7/2017 | Brown et al. |
| 2017/0314439 | A1* | 11/2017 | De Smet ............ F01N 13/0093 |
| 2018/0185788 | A1 | 7/2018 | Grubert et al. |
| 2018/0216510 | A1* | 8/2018 | Boerensen ............ F01N 9/00 |
| 2018/0304244 | A1 | 10/2018 | Bidal et al. |
| 2019/0168200 | A1 | 6/2019 | Chiffey et al. |
| 2019/0242288 | A1* | 8/2019 | Sappok ............ B01D 53/9495 |
| 2019/0299161 | A1* | 10/2019 | Collier ............ B01J 37/0201 |

FOREIGN PATENT DOCUMENTS

| | | |
|---|---|---|
| WO | 2016/070090 A1 | 5/2016 |
| WO | 2016/141142 A1 | 9/2016 |

OTHER PUBLICATIONS

International Search Report for PCT Patent Application No. PCT/US2020/064257, dated Mar. 23, 2021, 4 pages.

* cited by examiner

LEAN NO$_X$ TRAP PLUS LOW TEMPERATURE NO$_X$ ADSORBER SYSTEM FOR LOW TEMPERATURE NO$_X$ TRAPPING

This application is a national stale of PCT/US2020/064257, filed Dec. 10, 2020, which claims the benefit of priority to U.S. Provisional Application No. 62/947,780, filed Dec. 13, 2019, the contents of which are incorporated by reference in herein in their entirety.

The present disclosure relates generally to emission treatment systems and methods suitable for treating exhaust gas streams of lean burn engines containing nitrogen oxides (NOx).

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides (NO$_x$), wherein NO$_x$ describes various chemical species of nitrogen oxides, including nitrogen monoxide (NO) and nitrogen dioxide (NO$_2$), among others. NO$_x$ are harmful components of atmospheric pollution. Various methods have been used for the treatment of NO$_x$-containing gas mixtures to decrease atmospheric pollution.

An effective method to reduce NO$_x$ from the exhaust of lean-burn engines requires reaction of NO$_x$ under lean burn engine operating conditions with a suitable reductant in the presence of a selective catalytic reduction (SCR) catalyst component. The SCR process may use a reductant, such as ammonia or a hydrocarbon in the presence of atmospheric oxygen, resulting in the formation predominantly of nitrogen and steam:

4NO+4NH$_3$+O$_2$→4N$_2$+6H$_2$O(standard SCR reaction)

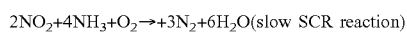
2NO$_2$+4NH$_3$+O$_2$→+3N$_2$+6H$_2$O(slow SCR reaction)

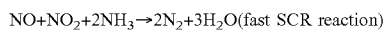
NO+NO$_2$+2NH$_3$→2N$_2$+3H$_2$O(fast SCR reaction)

Current catalysts employed in the SCR process include molecular sieves, such as zeolites, ion-exchanged with a catalytic metal such as iron or copper. A useful SCR catalyst component is able to effectively catalyze the reduction of the NO$_x$ exhaust component at temperatures below 600° C. so that reduced NO$_x$ levels can be achieved even under conditions of low load, which are associated with lower exhaust temperatures.

A problem encountered in the treatment of automotive exhaust gas streams is the so-called "cold start" period, which is the time period at the beginning of the treatment process, when the exhaust gas stream and the exhaust gas treatment system are at low temperatures (e.g., below 150° C.). At these low temperatures, exhaust gas treatment systems generally do not display sufficient catalytic activity for effectively treating HC. NO$_x$ and/or CO emissions. In general, catalytic components such as SCR catalyst components are effective in converting NO$_x$ to N$_2$ at temperatures above 200° C., but may not exhibit sufficient activities at lower temperature regions (e.g., <200° C.), which may be found during cold-start or prolonged low-speed city driving. Accordingly, there is a demand for catalytic components capable of capturing and storing low-temperature NO$_x$ emissions, and releasing them at higher temperatures (e.g., >200° C.) when catalytic components (e.g., SCR catalyst components) become effective. Considerable efforts have been made to address this problem.

There are several ways to minimize NO$_x$ emissions during cold start periods. For instance, trapping systems have been developed to store these exhaust gas emissions (e.g., HC, CO and NO$_x$ gases) at low temperatures and subsequently release them at higher temperatures, w % ben the remaining catalytic components of the treatment system have attained sufficient catalytic activity. One example of such system is the Lean NO$_x$ Trap (LNT) catalyst.

Lean NO$_x$ trap (LNT) catalysts contain NO$_x$ adsorbent components that trap NO$_x$ under certain exhaust conditions. For example, the NO$_x$ adsorbent components can comprise alkaline earth elements, e.g., including alkaline earth metal oxides, such as oxides of magnesium (Mg), calcium (Ca), strontium (Sr), and/or barium (Ba). Other LNT catalysts can contain rare earth metal oxides as NO$_x$ adsorbent components, such as oxides of cerium (Ce), lanthanum (La), praseodymium (Pr), and/or neodymium (Nd). LNT catalysts further contain a platinum group metal (PGM) component, such as platinum dispersed on a refractory metal oxide (e.g., alumina) support, for catalytic NO$_x$ oxidation and reduction. The PGM component serves to oxidize nitric oxide (NO) to nitrogen dioxide (NO$_2$). The LNT catalyst operates under cyclic lean (trapping mode) and rich (regeneration mode) exhaust conditions. Under lean conditions, the LNT catalyst traps and stores NO$_x$ as an inorganic nitrate (for example, where the NO$_x$ adsorbent component is barium oxide (BaO) or barium carbonate (BaCO$_3$), it is converted to barium nitrate (Ba(NO$_3$)$_2$) upon reaction with ("trapping") of NO$_x$. The NO$_x$ adsorbent component then releases the trapped NO$_x$ and the PGM component reduces the NO$_x$ to N$_2$ under stoichiometric or transient rich engine operating conditions, or under lean engine operation with external fuel injected in the exhaust to induce rich conditions. The general principle of operation of the LNT includes that certain metal compounds (e.g., alkaline earth metal carbonates) undergo a carbonate/nitrate conversion, as a dominant path, during lean/rich operations according to the following equations:

Oxidation of NO to NO$_2$(Lean Condition)

$$2NO+O_2 \rightarrow 2NO_2 \quad (1)$$

NO$_x$ Storage as Nitrate (Trapping Mode)

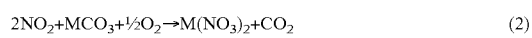
$$2NO_2+MCO_3+\tfrac{1}{2}O_2 \rightarrow M(NO_3)_2+CO_2 \quad (2)$$

NO$_x$ Release (Rich Condition)

$$M(NO_3)_2+2CO \rightarrow MCO_3+NO_2+NO+CO_2 \quad (3)$$

NO$_x$ Reduction to N$_2$(Regeneration Mode)

$$NO_2+CO \rightarrow NO+CO_2 \quad (4)$$

$$2NO+2CO \rightarrow N_2+2CO_2 \quad (5)$$

The LNT catalyst promotes the storage of NO$_x$ during a lean period of operation (λ>1.0) (e.g., according to equations (1) and (2)), and during a rich period (λ<1.0), it catalyzes the release and reduction of stored NO$_x$ to N$_2$ (e.g., according to equations (3), (4), and (5)), where a represents the air/fuel ratio. In equations (2) and (3), M represents a metal cation, such as a divalent metal cation. M can also be included in a monovalent or trivalent metal compound in which case the equations need to be rebalanced.

Another method of trapping $NO_x$ is with a low-temperature $NO_x$ adsorber (LT-NA). Several varieties of LT-NAs are known. One relatively new LT-NA useful for low-temperature trapping of $NO_x$ utilizes a palladium (Pd)-exchanged zeolite to trap NO without catalytic pre-oxidation to $NO_2$ (which is slow at T<180° C.). In theory, a LT-NA may be used in combination with an LNT to effectively trap low temperature emissions of $NO_x$. However, use of a LT-NA in conjunction with a LNT is complicated by the discovery that the rich purge necessary to regenerate the LNT is destructive to the $NO_x$ storage capacity of the LT-NA. To avoid such event, U.S. Patent Application Publication No. 2017/0096922 describes a system with a LT-NA (referred to as a passive $NO_x$ adsorber; "PNA") disposed upstream of an LNT. The rich condition necessary to regenerate the LNT is produced with injection of fuel from a fuel injector placed downstream of the $NO_x$ absorber and upstream of the LNT. In this configuration, the LNT may be regenerated without exposing the upstream $NO_x$ adsorber to reducing gases. However, this configuration is inherently more complicated to implement.

Accordingly, there is a need for a system to trap and remove $NO_x$ emissions generated at low temperatures by incorporating an LNT and an LT-NA in a configuration which does not require an additional fuel injection device.

The present disclosure generally provides exhaust gas treatment systems which exhibit enhanced $NO_x$ adsorption tinder low temperature conditions and methods of treating exhaust gas streams containing NO using such treatment systems. Such systems generally comprise a lean-$NO_x$ trap (LNT) and a low-temperature $NO_x$ adsorber (LT-NA) suitable for adsorbing $NO_x$ at low temperatures and releasing the trapped $NO_x$ at elevated temperatures. In particular, such systems comprise a LNT followed downstream by a LT-NA Use of a LT-NA downstream from a LNT would normally be prohibited by the fact that the storage function of the LT-NA is strongly deactivated by the rich $deNO_x$ condition used to regenerate the LNT. Surprisingly, it has been found that by placing the LT-NA downstream of the LNT and controlling the composition and timing of the $deNO_x$ reducing pulse, the LT-NA is protected from exposure to the reductants by the oxygen-storage function of the LNT, thus extending the useful low temperature trapping range of the system for cold-start $NO_x$ emissions.

Accordingly, in a first aspect is provided an emission treatment system for $NO_x$ abatement in an exhaust stream of a lean burn engine, the emission treatment system comprising a lean $NO_x$ trap (LNT) comprising an oxygen storage component (OSC) and a first platinum group metal (PGM) component, wherein the LNT is in fluid communication with and downstream from the lean burn engine; and a low-temperature $NO_x$ adsorber (LT-NA) comprising a molecular sieve comprising a second PGM component, wherein the LT-NA is in fluid communication with and downstream of the LNT.

In some embodiments, the LNT is disposed on a first substrate, and the LT-NA is disposed on a second substrate. In some embodiments, the first substrate is a honeycomb substrate in the form of a flow-through filter, and the second substrate is a honeycomb substrate in the form of a flow-through filter or a wall-flow filter.

In some embodiments, the LNT and LT-NA are disposed on the same substrate in a zoned configuration, the substrate having an inlet end and an outlet end defining an overall length, wherein the LNT is disposed on the substrate extending from the inlet end to a length of from about 20% to about 100% of the overall length; and wherein the LT-NA is disposed on the substrate extending from the outlet end to a length of from about 20% to about 100% of the overall length. In some embodiments, the LNT is disposed directly on the substrate covering 100% of the overall length; and the LT-NA is disposed on the LNT, covering from about 20% to about 80% of the overall length. In some embodiments, the LT-NA is disposed directly on the substrate covering 100% of the overall length; and the LNT is disposed on the LT-NA, covering from about 20% to about 80% of the overall length. In some embodiments, the LNT is disposed directly on the substrate, and the LT-NA is disposed directly on the substrate. In some embodiments, the substrate is a honeycomb substrate in the form of a flow-through filter.

In some embodiments, the OSC comprises ceria. In some embodiments, the OSC further comprises one or more chosen from zirconia, alumina, silica, titania, lanthana, baria, praseodymia, yttria, samaria, gadolinia, and combinations thereof.

In some embodiments, the first PGM component is chosen from platinum, palladium, rhodium, and combinations thereof. In some embodiments, the first PGM component is palladium. In some embodiments, the second PGM component resides in ion-exchanged sites in the molecular sieve.

In some embodiments, the second PGM component is chosen from platinum, palladium, rhodium, and combinations thereof. In some embodiments, the second PGM component comprises a mixture of platinum and palladium.

In some embodiments, the molecular sieve has a framework type chosen from ABW, ACO, AEI, AEL, AEN, AET, AFG, AFI, AFN, AFO, AFR, AFS, AFT, AFX, AFY, AFT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DOH, DON, EAB, EDI, EEL, EMT, EON, EPI, ERI, ESV, ETR, EUO, EZT, FAU, FER, FRA, GIS, GIU, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LIO, LIT, LOS, LOV, LTA, LTF, LTL, LTN, MAR, MAZ, MEI, MEL, MEP, MER, MF, MFS, MON, MOR, MOZ, MRE, MSE, MSO, MTF, MTN, MTT, MVY, MTW, MWF, MWW, NAB, NAT, NES, NON, NPO, NPT, NSI, OBW, OFF, OKO, OSI, OSO, OWE, PAR, PAU, PCR, PHI, PON, PUN, RHO, RON, RRO, RSN, RTE, RTH, RUT, RWR, RWY, SAF, SAO, SAS, SAT, SAV, SBE, SBS, SBT, SCO, SEW, SFE, SFF, SFG, SFH, SFN, SFO, SFS, SFW, SGF, SGT, SIV, SOD, SOF, SOS, SSF, SSY, STF, STI, STO, STT, STW. SVR, SZR, TER, THO. TON, TSC, TUN, UEI, UFI, UOS, UOZ, USI, UTL, UWY. VET. VFI, VNI, VSV. WIE. WEN. YUG, ZON, and mixtures or intergrowths thereof. In some embodiments, the molecular sieve has a framework type chosen from AFX, CHA. FER. In some embodiments, the molecular sieve is an aluminosilicate zeolite. In some embodiments, the molecular sieve is chosen from Type A, beta zeolite, chabazite, erionite, faujasite, ferrierite, mordenite, silicalite, SSZ-13, stilbite, ZSM-5, ZSM-11, ZSM-23. ZSM-48, zeolite X, and zeolite Y. In some embodiments, the molecular sieve is ferrierite.

In some embodiments, the LNT is configured to remove reducing gases present during a rich condition; and wherein the LNT is configured to prevent the reducing gases from entering the downstream LT-NA.

In some embodiments, the emission treatment system further comprises a lambda sensor disposed downstream of the LNT. In some embodiments, the emission treatment system further comprises one or more chosen from a selective catalytic reduction (SCR) catalyst, an ammonia or ammonia precursor injection component, a diesel oxidation catalyst (DOC), a catalyzed soot filter (CSF), or an ammonia oxidation (AMOX) catalyst, and combinations thereof. In some embodiments, the SCR is downstream of and in fluid communication with the LT-NA.

In another aspect is provided a method for abating $NO_x$ in an exhaust stream from a lean burn engine, the method comprising contacting the exhaust gas stream with the emission treatment system as disclosed herein. In some embodiments, the method further comprises operating the lean burn engine in a rich mode that produces a rich exhaust stream containing reducing gases comprising hydrocarbons (HC) and carbon monoxide (CO); passing the rich exhaust gas stream through the LNT, thereby creating a reducing atmosphere therein, and regenerating the LNT in the reducing atmosphere: wherein the lean burn engine is operated in the rich mode to sufficiently regenerate the LNT without exceeding the adsorption capacity of the LNT for the reducing gases. In some embodiments, the method further comprises monitoring the exhaust stream exiting the LNT with a lambda sensor, and returning the lean burn engine to a lean mode to end operating the lean burn engine in the rich mode according to a monitoring result, thereby preventing exposure of the LT-NA to the reducing atmosphere.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise. Other aspects and advantages of the present disclosure will become apparent from the following.

BRIEF DESCRIPTION OF THE DRAWINGS

In order to provide an understanding of embodiments of the disclosure, reference is made to the appended drawings, in which reference numerals refer to components of example embodiments of the disclosure. The drawings are provided as examples only, and should not be construed as limiting the scope of the disclosure. The disclosure described herein is illustrated by way of example and not by way of limitation in the accompanying figures. For simplicity and clarity of illustration, features illustrated in the figures are not necessarily drawn to scale. Further, where considered appropriate, reference labels have been repeated among the figures to indicate corresponding or analogous elements.

Figure 1A:
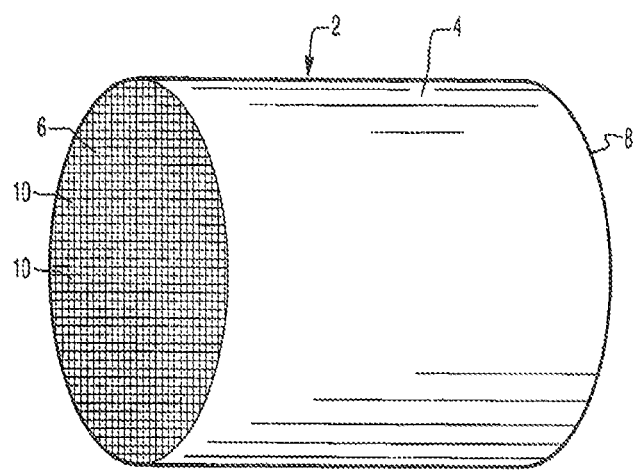
FIG. 1A depicts a perspective view of a honeycomb-type substrate which may comprise a composition (e.g., Lean $NO_x$ Trap (LNT) and/or Low-Temperature $NO_x$ Adsorber (LT-NA)) in accordance with some embodiments of the present disclosure.

The present disclosure generally provides exhaust gas treatment systems which exhibit enhanced $NO_x$ adsorption under low temperature conditions and methods of treating exhaust gas streams containing $NO_x$ using such treatment systems. In some embodiments, such systems comprise a lean-$NO_x$ trap (LNT) followed downstream by a low temperature $NO_x$ adsorber (LT-NA). Such systems are effective in trapping and storing $NO_x$ under cold-start conditions, and releasing $NO_x$ as downstream emission treatment components reach their operating temperatures. This low temperature adsorption performance is important when, for example, these $NO_x$ adsorption components are placed upstream of a selective catalytic reduction (SCR) catalyst that is effective in converting $NO_x$ to $N_2$ at temperatures above 200° C., but not sufficiently active at lower temperature regions (e.g., <200° C.), such as during a cold-start.

Use of an LT-NA downstream of an LNT may be affected as the adsorption capacity of the LT-NA can be reduced or deactivated by the rich $deNO_x$ condition used to regenerate the upstream LNT. To address this issue, according to some embodiments of the present disclosure, by placing an LT-NA downstream of an LNT, and controlling the composition and timing of the $deNO_x$ reducing pulse, the LT-NA is protected from exposure to the reductants in the exhaust gas stream by the oxygen-storage function of the LNT, thereby extending the useful low temperature trapping range of the system for abating cold-start $NO_x$ emissions.

Definitions

As used herein, "a" or "an" refers to one or more than one (e.g., at least one) of the following object. As such, the terms "a" (or "an"), "one or more", and "at least one" are used interchangeably herein. Any ranges cited herein are inclusive. The term "about" used throughout is used to describe and account for small variations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0.

The term "abatement" means a decrease in the amount, caused by any means.

"$AMO_x$" refers to a selective ammonia oxidation catalyst, which is a catalyst containing one or more metals (such as Pt, and not limited thereto) and a selective catalytic reduction (SCR) catalyst suitable to convert ammonia to nitrogen.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

The term "average particle size" is synonymous with D50, meaning half of the population of particles has a particle size above this point, and half below. Particle size refers to primary particles. Particle size may be measured by laser light scattering techniques, with dispersions or dry powders, for example according to standard test method ASTM D4464. D90 particle size distribution indicates that 90% of the particles (e.g., by number) have a Feret diameter below a certain size as measured by Scanning Electron Microscopy (SEM) or Transmission Electron Microscopy (TEM) for submicron size particles; and a particle size analyzer for the support-containing particles (e.g., at micron size).

The term "catalyst" refers to a material that promotes a chemical reaction. The catalyst includes the "catalytically active species" and the "support" that carries or supports the active species. For example, zeolites are supports for palladium active catalytic species. Likewise, refractory metal oxide particles may be a support for platinum group metal catalytic species. The catalytically active species are also termed "promoters" as they promote chemical reactions. For instance, a present palladium-containing rare earth metal component may be termed a Pd-promoted rare earth metal component. A "promoted rare earth metal component" refers to a rare earth metal component to which catalytically active species are intentionally added.

The term "catalytic article" in the disclosure means an article comprising a substrate having a catalyst coating composition.

The term "crystal size" as used herein means the length of one edge of a face of the crystal, such as the longest edge, provided that the crystals are not needle-shaped. Direct measurement of the crystal size can be performed using microscopy methods, such as SEM and TEM. For example, measurement by SEM involves examining the morphology of materials at high magnifications (such as 1000× to 10,000×). The SEM method can be performed by distributing a representative portion of the zeolite powder on a suitable mount such that individual particles are reasonably evenly spread out across the field of view, e.g., at 1000× to 10,000× magnification. From this population, a statistically significant sample of random individual crystals (e.g., 50-200) are examined and the longest dimensions of the individual crystals parallel to the horizontal line of the straight edge are measured and recorded.

The term "configured" as used in the description and claims is intended to be an open-ended term as are the terms "comprising" or "containing." The term "configured" is not meant to exclude other possible articles or elements. The term "configured" may be equivalent to "adapted."

The term "CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. An SCR catalyst composition can also be coated directly onto a wall-flow filter, which is called SCRoF.

The term "DOC" refers to a diesel oxidation catalyst, which converts hydrocarbons and carbon monoxide in the exhaust gas of a diesel engine. In some embodiments, a DOC comprises one or more platinum group metals such as palladium and/or platinum; a support material such as alumina; a zeolite for HC storage; and optionally, promoters and/or stabilizers.

As used herein, the phrase "emission treatment system" refers to a combination of two or more catalyst components, for example, a combination of an LNT-LT-NA as disclosed herein and one or more additional catalyst components which may be, for example, a CSF, a DOC, or a selective catalytic reduction (SCR) catalytic article.

In general, the term "effective" means, for example, from about 35% to 100% effective, for instance from about 40%, about 45%, about 50%, or about 55% to about 60%, about 65%, about 70%, about 75%, about 80%, about 85%, about 90%, or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and may be, for example, exhaust of a lean burn engine, which may contain certain non-gaseous components such as liquid droplets, solid particulates, and the like. The exhaust gas stream of a combustion engine may further comprise combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

The term "in fluid communication" is used to refer to articles positioned on the same exhaust line, e.g., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

The term "functional article" in the disclosure means an article comprising a substrate having a functional coating composition disposed thereon, such as a catalyst and/or sorbent coating composition.

As used herein, "impregnated" or "impregnation" refers to permeation of the catalytic material into the porous structure of the support material.

As used herein, "lean gaseous stream" includes lean exhaust streams and refers to gas streams that have a $\lambda>1.0$, where $\lambda$ refers to the air/fuel ratio.

As used herein, "lean period" refers to a period of exhaust treatment where the exhaust gas composition is lean, e.g., has a $\lambda>1.0$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (e.g., "on" is not equated with "directly on").

As used herein, the term "promoted" refers to a component that is intentionally added to the rare earth metal component, as opposed to impurities inherent in the rare earth metal component. "Promoters" are metals that enhance activity toward a desired chemical reaction or function.

As used herein, "rich gaseous stream" includes rich exhaust streams and refers to gas streams that have a $\lambda<1.0$.

As used herein, "rich period" refers to a period of exhaust treatment where the exhaust gas composition is rich, e.g., has a $\lambda<1.0$.

As used herein, the term "selective catalytic reduction" (SCR) refers to the catalytic process of reducing oxides of nitrogen to dinitrogen ($N_2$) using a nitrogenous reductant.

As used herein, the terms "nitrogen oxides" or "$NO_x$" designate oxides of nitrogen, such as $NO_x$ $NO_2$, or $N_2O$.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine may further comprise combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substantially free" means "little or no" or "no intentionally added" and also having only trace and/or inadvertent amounts. For instance, in certain embodiments, "substantially free" means less than 2 wt. % (weight %), less than 1.5 wt. %, less than 1.0 wt. %, less than 0.5 wt. %, 0.25 wt. % or less than 0.01 wt. %, based on the weight of the indicated total composition.

As used herein, the term "substrate" refers to the monolithic material onto which the catalyst composition, that is, catalytic coating, is disposed, for example in the form of a washcoat. In one or more embodiments, the substrates are flow-through monoliths and monolithic wall-flow filters. Flow-through and wall-flow substrates are also taught, for example, in International Application Publication No. WO2016/070090, which is incorporated herein by reference. A washcoat is formed by preparing a slurry containing a specified solids content (e.g., 30-90% by weight) of catalyst in a liquid, which is then coated onto a substrate and dried to provide a washcoat layer. Reference to "monolithic substrate" means a unitary structure that is homogeneous and continuous from inlet to outlet. A washcoat is formed by preparing a slurry containing a certain solid content (e.g., 20%-90% by weight) of particles in a liquid vehicle, which is then coated onto a substrate and dried to provide a washcoat layer.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. As used herein and as described in Heck, Ronald and Farrauto, Robert, Catalytic Air Pollution Control, New York. Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

"Weight percent (wt. %)," if not otherwise indicated, is based on an entire composition free of any volatiles, that is, based on dry solids content. Unless otherwise indicated, all parts and percentages are by weight.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods. All U.S. patent applications, Pre-Grant publications and patents referred to herein are hereby incorporated by reference in their entireties.

In some embodiments, an emission treatment system is provided for $NO_x$ abatement in an exhaust stream of a lean burn engine. The emission treatment system comprises a lean $NO_x$ trap (LNT) comprising an oxygen storage component (OSC) and a first platinum group metal (PGM) component, wherein the LNT is in fluid communication with and downstream from the lean burn engine. The emission treatment system further comprises a low temperature NOx adsorber (LT-NA) comprising a molecular sieve comprising a second platinum group metal (PGM) component, wherein the LT-NA is in fluid communication with and downstream of the LNT. The LNT and LT-NA, as well as further components of the emission treatment system, are disclosed in further detail herein below.

Lean $NO_x$ Trap (LNT)

As disclosed herein, some embodiments of the emission treatment systems comprise an LNT. In principle, the LNT may be any LNT known in the art. In some embodiments, the LNT is similar to one of those disclosed in United States Patent Application Publication No. 20090320457 to Wan, which is incorporated herein by reference in its entirety. In some embodiments, the LNT comprises an oxygen storage component (OSC) and a first platinum group metal (PGM) component. The OSC and the first PGM component are described in more detail herein below.

Oxygen Storage Component (OSC)

As used herein, OSC refers to an entity that has multivalent oxidation states and that can actively react with oxidants such as oxygen ($O_2$) or nitrogen oxides ($NO_x$) under oxidizing conditions, or react with reductants such as carbon monoxide (CO), hydrocarbons (HC), or hydrogen ($H_2$) under reducing conditions. For example, cerium (Ce) in ceria ($CeO_2$), (e.g., with a valence state of $Ce^{+4}$), when subjected to reducing conditions, may contain a portion of the Ce atoms in the $Ce^{+3}$ valence state.

Some example embodiments of OSCs include rare earth metal oxides, which refer to one or more chosen from oxides of scandium (Sc), yttrium (Y), and the lanthanide series as defined in the Periodic Table of Elements, and combinations thereof. In some embodiments, the OSC includes a single rare earth metal oxide (e.g., 100 weight percent). In some embodiments, the OSC may comprise a mixture of multiple rare earth metal oxides. For example, ceria can be delivered as a mixed oxide of cerium (Ce) and zirconium (Zr), and/or a mixed oxide of cerium (Ce), zirconium (Zr), and neodymium (Nd). For example, praseodymia can be delivered as a mixed oxide of praseodymium (Pr) and zirconium (Zr), and/or a mixed oxide of praseodymium (Pr), cerium (Ce), lanthanum (La), yttrium (Y), zirconium (Zr), and neodymium (Nd). In some embodiments, the OSC comprises one or more chosen from ceria, zirconia, alumina, silica, titania, lanthana, baria, praseodymia, yttria, samaria, gadolinia, and combinations thereof. In some embodiments, the OSC comprises ceria. In some embodiments, the OSC comprises ceria and one or more additional rare earth metal oxide(s).

First Platinum Group Metal (PGM) Component

The LNT, as disclosed herein, comprises a first platinum group metal (PGM) component in combination with the OSC. The first PGM performs the role of catalytic $NO_x$ oxidation and reduction. The term "PGM component" refers to any component that includes a PGM, which may include one or more chosen from ruthenium (Ru), rhodium (Rh), osmium (Os), iridium (Ir), palladium (Pd), platinum (Pt), gold (Au), and combinations thereof. Reference to "PGM component" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the first PGM component comprises one or more chosen from palladium, platinum, rhodium, rhenium, ruthenium, iridium, and combinations thereof. In some embodiments, the first PGM component comprises palladium, platinum, or a mixture thereof. In some embodiments, the first PGM component comprises two platinum group metals, e.g., in a weight ratio of about 1:10 to about 10:1. For example, in some embodiments, the first PGM component comprises platinum and palladium. In some embodiments, the first PGM component includes one platinum group metal. For example, the first PGM component is palladium. In another example, the first PGM component is platinum.

The first PGM component may be present in the LNT in an amount in the range of about 0.01% to about 5% or about 0.1% to about 3% by weight on a metal basis. In some embodiments, the first PGM is present in a range from about 0.5% to about 2.5% by weight (e.g., about 2% by weight) in the LNT.

$NO_x$ Adsorbent Component

In some embodiments, the LNT further comprises a $NO_x$ adsorbent component, for example, chosen from an alkali metal component, an alkaline earth metal component, and combinations thereof. In some embodiments, the $NO_x$ adsorbent component comprises an alkali metal component. As used herein, the term "alkali metal component" refers to one or more chemical elements chosen from Group I of the Periodic Table of Elements, for example, in the form of an oxide, hydroxide, or carbonate. In some embodiments, the alkali metal is chosen from potassium (K), sodium (Na), lithium (Li), cesium (Cs), and combinations of two or more thereof. The alkali metal component can be present in the LNT in an amount from about 1% to about 30%, about 1% to about 20%, or about 5% to about 10% by weight of the LNT on an oxide basis.

In some embodiments, the LNT further comprises an alkaline earth metal component. As used herein, the term "alkaline earth metal component" refers to one or more elements chosen from Group II of the Periodic Table of Elements, including beryllium (Be), magnesium (Mg), calcium (Ca), strontium (Sr), and barium (Ba), for example, in the form of an oxide, hydroxide, or carbonate. In some embodiments, the alkaline earth metal component can be incorporated into the $NO_x$ adsorber component as a salt and/or oxide (e.g., $BaCO_3$). In one or more embodiments, the alkaline earth metal component comprises barium. The alkaline earth metal component can be present in the LNT in an amount from about 1% to about 30%, about 1% to about 20%, or about 5% to about 10% by weight of the LNT on an oxide basis.

For additional examples of $NO_x$ adsorbent components, see, U.S. Pat. No. 5,750,082 to Hephum et al.; U.S. Pat. No. 8,105,559 to Melville et al.; U.S. Pat. No. 8,475,752 to Wan et al.; U.S. Pat. No. 8,592,337 to Holgendorff et al.; U.S. Pat. No. 9,114,385 to Briskley et al.; U.S. Pat. No. 9,486,791 to Swallow et al.; U.S. Pat. No. 9,610,564 to Xue et al.; U.S. Pat. No. 9,662,611 to Wan et al.; U.S. Patent Application Publication Nos. 2002/0077247 to Bender et al.; 2011/0305615 to Hilgendorff et al.; 2015/0157982 to Rajaram et al.; 2015/0158019 to Rajaram et al.; 2016/0228852 to Biberger et al.; and International Patent Application WO 2016/141142 to Grubert et al., each of which is incorporated by reference in its entirety.

Support

The OSC and the first PGM component may optionally be supported (disposed on or impregnated in) on a support material. For example, the PGM component can be supported on any suitable material. In some embodiments, the support material is a metal oxide support. As used herein, "metal oxide support" refers to metal-containing oxide materials exhibiting chemical and physical stability at high temperatures, such as the temperatures associated with diesel engine exhaust. Exemplary metal oxides include, but are not limited to, ceria, alumina, silica, zirconia, titania, or combinations thereof. For example, in some embodiments, metal oxides, such as alumina, silica, zirconia, or titania, can be combined as physical mixtures or chemical combinations with ceria to form the metal oxide support.

In some embodiments, the metal oxide support comprises atomically-doped combinations of metal oxides. For example, in some embodiments, the metal oxide support is modified to contain a dopant metal in oxide form, such as, but not limited to, a lanthanide group metal or metals selected from La, Pr, Nd, Pm, Sm, Eu, Gd, Tb, Dy, Ho, Er, Tm, Yb, Lu, Si, Nb, Zr and combinations thereof. In some embodiments, the dopant metal is chosen from Pr. Gd, Zr, and combinations thereof. In some embodiments, the total amount of the dopant metal or combination thereof ranges from about 0.1% to about 15% by weight based on the total weight of the LNT composition. In some embodiments, metal oxides include but are not limited to mixtures of two or more metal oxides chosen from alumina-zirconia, ceria-zirconia, alumina-ceria-zirconia, lanthana-alumina, lanthana-zirconia-alumina, baria-alumina, baria-lanthana-alumina, baria-lanthana-neodymian-alumina, alumina-ceria, and combinations thereof. In some embodiments, aluminas include large pore boehmite, gamma-alumina, delta/theta alumina, and combinations thereof. In some embodiments, commercial aluminas include activated aluminas, such as high bulk density gamma-alumina, low or medium bulk density large pore gamma-alumina, low bulk density large pore boehmite, gamma-alumina, and combinations thereof. In some embodiments, when the alumina is doped, the total amount of dopant is in a range from about 0.25% to 5% by weight, such as in a range from about 0.5% to 3% by weight (e.g. about 1% by weight) of the alumina. In some embodiments, no support material is present (e.g., the LNT does not comprise a support material).

While the foregoing description provides several suitable ranges or amounts for the first PGM component, alkali metal, alkaline earth metal, OSC, and support components of the LNT, it should be noted that each disclosed range or amount for one of these components may be combined with a disclosed range or amount for the other components to form new ranges or sub-ranges. Such embodiments are also expressly contemplated by and covered within the scope of the disclosure.

Low-Temperature NO$_x$ Adsorber (LT-NA)

A LT-NA as disclosed herein comprises a molecular sieve comprising a second platinum group metal (PGM) component. The molecular sieve and the second PGM component are described in more detail herein below.

Molecular Sieve

As used herein, the term "molecular sieve," such as a zeolite and other zeolitic framework material (e.g. isomorphously substituted material), refers to materials based on an extensive three-dimensional network of oxygen ions containing generally tetrahedral type sites and having a substantially uniform pore distribution, with the average pore size being no larger than about 20 Angstroms (Å).

Molecular sieves can be differentiated mainly according to the geometry of the voids which are formed by the rigid network of the SiO$_4$/AlO$_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the types and amounts of cations included in the molecular sieves lattice, range from about 3 Å to about 10 Å in diameter. The phrase "8-ring" molecular sieve refers to a molecular sieve having 8-ring pore openings and double-six ring secondary building units, and having a cage like structure resulting from the connection of double six-ring building units by 4 rings. Molecular sieves comprise small pore, medium pore, large pore molecular sieves, and combinations thereof. The pore sizes are defined by the ring size.

A small pore molecular sieve contains channels defined by up to eight tetrahedral atoms. As used herein, the term "small pore" refers to pore openings which are smaller than about 5 Angstroms, for example on the order of about 3.8 Angstroms. In some embodiments, small pore molecular sieves include framework types chosen from ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths thereof.

A medium pore molecular sieve contains channels defined by ten-membered rings. In some embodiments, medium pore molecular sieves include framework types chosen from AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF. SFG, STF, STI, STT, STW, SVR, SZR, TER, TON, TUN, UOS, VSV, WEI, WEN, and mixtures or intergrowths thereof.

A large pore molecular sieve contains channels defined by twelve-membered rings. In some embodiments, large pore molecular sieves include framework types chosen from AFT, AFR, AFS, AFY, ASV, ATO, ATS, BEA, BEC, BOG, BPH. BSV, CAN, CON, CZP, DFO, EMT, EON, EZT, FAU, GME, GON, IFR, ISV, ITG, IWR, IWS, IWV, IWW, JSR, LTF, LTL, MAZ, MET, MOR, MOZ, MSE, MTW, NPO, OFF, OKO, OSI, RON, RWY, SAF, SAO, SBE, SBS, SBT, SEW. SFE, SFO, SFS, SFV, SOF, SOS, STO, SSF, SSY, USI, UWY, VET, and mixtures or intergrowths thereof.

In some embodiments, any framework type of molecular sieve can be used, such as framework types chosen from ABW, ACO, AEI, AEL, AEN, AET, AFG, AFI, AFN, AFO, AFR, AFS, AFT. AFX, AFY. AHT, ANA, APC. APD. AST, ASV, ATN, ATO, ATS, ATT, ATV, AVL, AWO, AWW, BCT, BEA, BEC, BIK, BOG, BPH, BRE, CAN, CAS, SCO, CFI. SGF, CGS, CHA, CHI, CLO, CON, CZP, DAC, DDR, DFO, DFT, DOH, DON, EAB, EDI, EEI, EMT, EON, EPI, ERI, ESV, ETR. EUO, FAU, FER, FRA, GIS, GIU, GME, GON, GOO, HEU, IFR, IFY, IHW, IRN, ISV. ITE, ITH, ITW, IWR, IWW, JBW, KFI, LAU, LEV, LIO, LIT, LOS, LOV, LTA, LTL, LTN, MAR, MAZ, MET, MEL, MEP, MER, MFI, MFS, MON, MOR, MOZ, MSO, MTF, MTN, MIT, MTW, MWF, MWW, NAB, NAT, NES, NON, NPO, NPT, NSI, OBW, OFF, OSI, OSO, OWE, PAR, PAU, PHI, PON. RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, and combinations thereof.

For example, a present molecular sieve may comprise a framework type chosen from AEI, BEA (beta zeolites), CHA (chabazite), FAU (zeolite Y), FER (ferrierite), MFI (ZSM-5), and MOR (mordenite). In some embodiments, the molecular sieve has a framework type chosen from AFX, CHA, and FER.

As used herein, the term "zeolite" refers to a specific example of a molecular sieve, further including silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable. In some embodiments, aluminosilicate zeolite structures do not include phosphorus or other metals isomorphically substituted in the framework. That is, "aluminosilicate zeolite" may not include aluminophosphate materials such as SAPO, AlPO and MeAlPO materials. In some embodiments, the broader term "zeolite" includes aluminosilicates and aluminophosphates. For the purposes of this disclosure, SAPO, AlPO, and MeAlPO materials are considered non-zeolitic molecular sieves.

A zeolite may comprise $SiO_4/AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000.

Non-limiting examples of molecular sieves having the AEI, BEA, CHA, FAU, FER, MFI and MOR structures include chabazite, faujasite, zeolite Y, ultrastable zeolite Y, beta zeolite, mordenite, silicalite, zeolite X, and ZSM-5. In some embodiments, the molecular sieve is chosen from Type A, beta zeolite, chabazite, erionite, faujasite, ferrierite, mordenite, silicalite, SSZ-13, stilbite, ZSM-5, ZSM-11, ZSM-23, ZSM-48, zeolite X, and zeolite Y.

Second Platinum Group Metal (PGM) Component

The LT-NA as disclosed herein comprises a molecular sieve substituted with a second PGM component (e.g., the molecular sieve is a PGM component-substituted molecular sieve). As used herein, the term "PGM-substituted" embraces the term "ion-exchanged." As used herein, "ion-exchanged" or "PGM-exchanged" means that a PGM is supported on or in a molecular sieve material. In some embodiments, at least some of the PGM is in ionic form. In some embodiments, a portion of the PGM may be in the zero valent, metallic form, or may be in the form of metal oxide aggregates. In some embodiments, the disclosed LT-NA is described as comprising a molecular sieve "comprising" a second PGM component (or as comprising a second PGM component "associated with" the molecular sieve). In such instances, "comprising" (or "associated with") is understood to mean that the second PGM component resides either in the ion-exchange sites of the molecular sieve, on the surface of the molecular sieve, or both in the ion-exchange sites and on the surface of the molecular sieve. In some embodiments, the disclosed LT-NA may be described as comprising a molecular sieve "containing" a second PGM, and in such instances, "containing" is understood to mean that the PGM resides either in the ion-exchange sites of the molecular sieve or on the surface, or both.

With respect to the term "second PGM component," the term "PGM component" has the same meaning as described herein above for the first PGM component. The second PGM component may be the same as or different from the first PGM component. In some embodiments, the LT-NA as disclosed herein comprises a molecular sieve comprising a second PGM component, wherein the second PGM component is the same as the first PGM component. In some embodiments, the LT-NA as disclosed herein comprises a molecular sieve substituted with a second PGM component, wherein the second PGM component is different from the first PGM component.

In some embodiments, the second PGM component comprises one or more chosen from palladium, platinum, rhodium, rhenium, ruthenium, iridium, and combinations thereof. In some embodiments, the second PGM component comprises one or more chosen from platinum, palladium, rhodium, and combinations thereof. In some embodiments, the second PGM component comprises one or more chosen from palladium, platinum, and mixtures thereof. In some embodiments, the second PGM component comprises two platinum group metals, e.g., in a weight ratio of about 1:10 to about 10:1. For example, in some embodiments, the second PGM component comprises platinum and palladium. In some embodiments, the second PGM component comprises one platinum group metal, such as palladium.

The concentration of the second PGM component can vary, for example, from about 0.01 wt. % to about 6 wt. % relative to the total weight of the molecular sieve. The second PGM component may be present in the molecular sieve, for example, from about 0.1 wt. %, about 0.2 wt. %, about 0.5 wt. %, about 0.7 wt. %, about 0.9 wt. %, or about 1.0 wt. %, to about 1.5 wt. %, about 2.0 wt. %, about 2.5 wt. %, about 3.0 w about 3.5 wt. %, about 4.0 wt. %, about 4.5 wt. %, about 5.0 wt. %, or about 6 wt. %, based on the total dry weight of the molecular sieve. Weights of the second PGM component are measured and reported as the metal (e.g., weight of palladium). The total dry weight of the molecular sieve includes any added/exchanged metals (e.g., palladium).

In some embodiments, the molecular sieve of the LT-NA as disclosed herein has at least about 1% by weight of the amount of PGM located inside the pores of the molecular sieve, e.g., at least about 5% by weight, at least about 10% by weight, at least about 25% by weight, or at least about 50% by weight of the PGM located inside the pores of the molecular sieve.

In some embodiments, the molecular sieve of the LT-NA as disclosed herein may be substituted with a metal, for example, a base metal. Thus, the molecular sieve of the LT-NA may comprise a molecular sieve, a second PGM component, and optionally a base metal. The molecular sieve may contain the second PGM component and optionally the base metal. The base metal may be chosen from iron (Fe), copper (Cu), manganese (Mn), chromium (Cr), cobalt (Co), nickel (Ni), zinc (Zn), tin (Sn), and mixtures of two or more thereof. In some embodiments, the base metal is chosen from Fe, Cu, Co, and mixtures thereof. In some embodiments, the molecular sieve may be substantially free of a base metal. In some embodiments, the molecular sieve does not comprise a base metal. In some embodiments, the LT-NA is substantially free of any other active metal beyond the second PGM component.

Preparation of LNT and LT-NA Compositions

The LNT and LT-NA as disclosed herein may be readily prepared by processes known in the art. The disclosed LNT and/or LT-NA may, in some embodiments, be prepared via an incipient wetness impregnation method. Incipient wetness impregnation techniques, also called capillary impregnation, or dry impregnation, are used for the synthesis of heterogeneous materials, e.g., catalysts. For example, a metal precursor (e.g., a PGM component) is dissolved in an aqueous or organic solution and then the metal-containing solution is added to the material to be impregnated (e.g., a rare earth metal oxide or molecular sieve), and which contains the same pore volume as the volume of the solution that was added. Capillary action draws the solution into the pores of the material. Solution added in excess of the material pore volume causes the solution transport to change from a capillary action process to a diffusion process, which is much slower. The impregnated material can then be dried and calcined to remove the volatile components within the solution, depositing the metal on the surface of the material. The maximum loading is limited by the solubility of the precursor in the solution. The concentration profile of the impregnated material depends on the mass transfer conditions within the pores during impregnation and drying. One of skill in the art will recognize other methods for loading the PGM components into, e.g., the OSC and molecular sieve of the present LNT and LT-NA compositions, for example, by adsorption.

For example, in preparation of the LT-NA, the second PGM component may be added to the molecular sieve by any suitable means, and the manner of addition may not be critical. For example, a PGM component precursor (such as, for example, palladium nitrate) and optionally a base metal compound may be supported on the molecular sieve by impregnation, adsorption, ion-exchange, incipient wetness, precipitation, or the like. In some embodiments, non-limiting examples of suitable PGM component precursors include palladium nitrate, tetraammine palladium nitrate, tetraammine platinum acetate, platinum nitrate, and combinations thereof. During the calcination steps, or at least during the initial phase of use of the catalyst, such compounds are converted into a catalytically active form of the metal or a compound thereof.

Catalytic Articles

In one or more embodiments, the LNT and LT-NA as disclosed herein are disposed (coated) on one or more substrates as described herein below. In some embodiments, the LNT and LT-NA are provided on the one or more substrates in the form of one or more coatings. A substrate coated with the LNT and/or LT-NA is referred to as a catalyst article. Catalyst articles are part of an exhaust gas treatment system (e.g., catalyst articles including, but not limited to, articles including the LNT and LT-NA as disclosed herein). The individual components comprising such LNT and LT-NA articles are described in detail below (e.g., including the substrate(s), the coating(s), and coating configurations according to certain embodiments).

Substrates

In some embodiments, substrates are 3-dimensional, having a length, a diameter, and a volume, similar to a cylinder. In some embodiments, the shape does not necessarily have to conform to a cylinder. The length of the substrate is an axial length defined by an inlet end and an outlet end.

According to one or more embodiments, the substrate for the disclosed LNT and/or LT-NA article(s) may be constructed of any material that can be used for preparing automotive catalysts, and for example, comprise a metal or ceramic honeycomb structure. In some embodiments, the substrate provide a plurality of wall surfaces upon which the coating comprising the LNT and/or LT-NA is applied and adhered, thereby acting as a substrate for the catalyst composition.

In some embodiments, the substrates are ceramic substrates that can be made of any suitable refractory material, e.g., cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate, and/or the like.

In some embodiments, the substrates are metallic, comprising one or more metals or metal alloys. In some embodiments, a metallic substrate may include any suitable type, such as those with openings or "punch-outs" in the channel walls. The metallic substrates may be employed in various shapes such as pellets, corrugated sheet, or monolithic foam. Examples of metallic substrates include heat-resistant, base-metal alloys, such as those in which iron is a substantial or major component. For example, such alloys may contain one or more chosen from nickel, chromium, and aluminum, and the total of these metals may comprise at least about 15 wt. % (weight percent) of the alloy. For instance, a metallic substrate may include about 10 wt. % to about 25 wt. % chromium, about 1 wt. % to about 8 wt. % of aluminum, and from 0 to about 20 wt. % of nickel, in each case based on the weight of the substrate. In some embodiments, metallic substrates have straight channels. In some embodiments, metallic substrates have protruding blades along the axial channels to disrupt gas flow and to open communication of gas flow between channels. In some embodiments, metallic substrates have blades and also holes to enhance gas transport between channels allowing for radial gas transport throughout the monolith. Metallic substrates, for example, employed in certain embodiments in a close-coupled position, allow for fast heat-up of the substrate and, correspondingly, fast heat-up of a catalyst composition coated therein (e.g., a LNT and/or LT-NA catalyst composition).

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type that have a plurality of fine, substantially parallel gas flow passages extending along the longitudinal axis of the substrate where, for example, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the LNT is disposed on a first substrate, and the LT-NA is disposed on a second substrate. In some embodiments, the first substrate is a honeycomb substrate in the form of a flow-through filter, and the second substrate is a honeycomb substrate in the form of a flow-through filter or a wall-flow filter. In some embodiments, the LNT and LT-NA are both disposed on the same substrate. In some embodiments, the substrate comprises a honeycomb substrate in the form of a flow-through filter. Flow-through filters and wall-flow filters will be further discussed herein below.

Flow-Through Filter Substrates

In some embodiments, the substrate is a flow-through filter (e.g., a monolithic flow-through filter substrate, including a monolithic flow-through honeycomb filter substrate). Flow-through filter substrates have fine, parallel gas flow passages extending from an inlet end to an outlet end of the substrate such that passages are open to fluid flow. The passages, which are substantially straight paths from their fluid inlet to their fluid outlet, are defined by walls on which a catalytic coating is disposed, so that gases flowing through the passages contact the catalytic material. The flow passages of the flow-through filter substrate are thin-walled channels, which can be of any suitable cross-sectional shape and size, such as trapezoidal, rectangular, square, sinusoidal, hexagonal, oval, circular, etc. The flow-through filter substrate can be ceramic or metallic as described above.

Flow-through filter substrates can, for example, have a volume in a range from about 50 in$^3$ to about 1200 in$^3$, a cell density (e.g., inlet openings) in a range from about 60 cells per square inch (cpsi) to about 500 cpsi or up to about 900 cpsi, for example, from about 200 cpsi to about 400 cpsi, and a wall thickness in a range from about 50 microns to about 200 microns or about 400 microns.

Figure 1B:
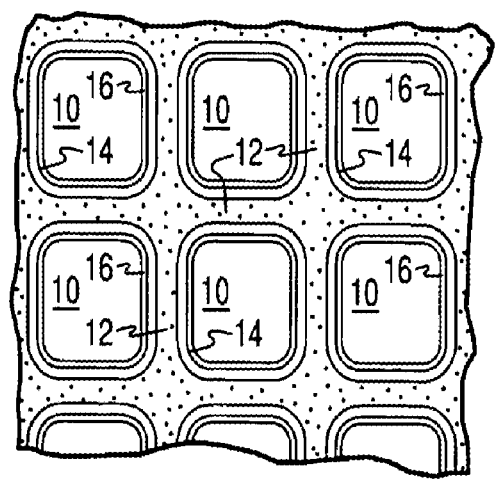
FIG. 1B depicts a partial cross-sectional view enlarged relative to FIG. 1A and taken along a plane parallel to the end faces of the substrate of FIG. 1A, which shows an enlarged view of a plurality of the gas flow passages shown in FIG. 1, in an embodiment where the substrate is a flow-through substrate.

A catalytic article can be provided by applying a catalytic coating (e.g., as disclosed here) to the substrate as a washcoat. FIGS. 1A and 1B illustrate an example substrate 2 in the form of a flow-through filter substrate coated with a catalyst composition as described herein. Referring to FIG. 1A, the example substrate 2 has a cylindrical shape and a cylindrical outer surface 4, an upstream end face 6, and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers, if desired. In the illustrated embodiment, the catalyst composition consists of both a discrete bottom layer 14 adhered to the walls 12 of the carrier member and a second discrete top layer 16 coated over the bottom layer 14. The present disclosure can be practiced with one or more (e.g., two, three, four, or more) catalyst composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. In some embodiments, each passage is blocked at one end of the substrate body, with alternate passages blocked at opposite end-faces. Such monolithic wall-flow filter substrates may contain up to about 900 or more flow passages (or "cells") per square inch of cross-section, although fewer may be used. For example, the substrate may have from about 7 to about 600, more usually from about 100 to about 400, cells per square inch ("cpsi"). The cells can have cross-sections that are rectangular, square, circular, oval, triangular, hexagonal, or are of other polygonal shapes.

Figure 2:
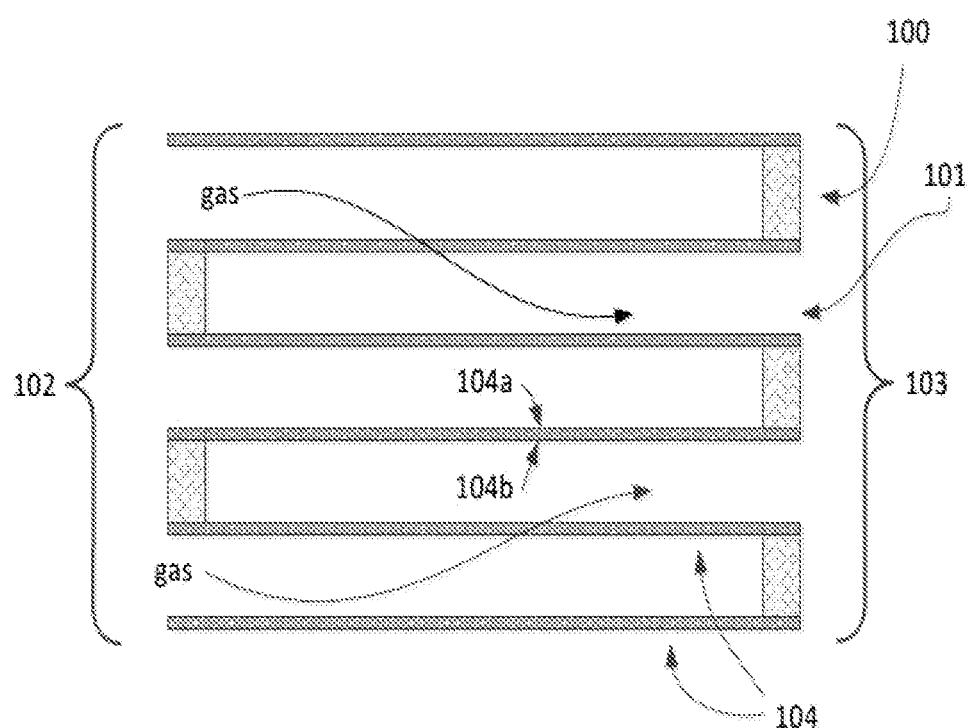
FIG. 2 depicts a cutaway view of a section of the honeycomb-type substrate in FIG. 1A which represents a wall-flow filter.

FIG. 2 is a perspective view of an example wall-flow filter. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104, and exiting the open outlet cell ends. Plugged ends 100 prevent gas flow and encourage diffusion through the cell walls. Each cell wall has an inlet side 104a and outlet side 104b. The passages are enclosed by the cell walls.

The wall-flow filter article substrate may have a volume of, for instance, from about 50 cm$^3$, about 100 cm$^3$, about 200 cm$^3$, about 300 cm$^3$, about 400 cm$^3$, about 500 cm$^3$, about 600 cm$^3$, about 700 cm$^3$, about 800 cm$^3$, about 900 cm$^3$, or about 1000 cm$^3$, to about 1500 cm$^3$, about 2000 cm$^3$, about 2500 cm$^3$, about 3000 cm$^3$, about 3500 cm$^3$, about 4000 cm$^3$, about 4500 cm$^3$, or about 5000 cm$^3$. Wall-flow filter substrates may have a wall thickness from about 50 microns to about 2000 microns, for example, from about 50 microns to about 450 microns, or from about 150 microns to about 400 microns.

The walls of the wall-flow filter are porous and may have a wall porosity of at least about 50% or at least about 60% with an average pore size of at least about 5 microns prior to disposition of the functional coating. For instance, the wall-flow filter article substrate, in some embodiments, may have a porosity of >50%, >60%, 65%, or 70%. For instance, the wall-flow filter article substrate will have a wall porosity from about 50%, about 60%, about 65%, or about 70%, to about 75%, about 80%, or about 85%, and an average pore size from about 5 microns, about 10 microns, about 20 microns, about 30 microns, about 40 microns, or about 50 microns, to about 60 microns, about 70 microns, about 80 microns, about 90 microns, or about 100 microns, prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (e.g., static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Wall-flow filters can have high porosity, allowing high loadings of catalyst compositions without excessive backpressure during operation.

Coatings and Coating Compositions

To produce catalyst articles, a substrate as disclosed herein is coated with a catalyst composition (e.g., LNT and/or LT-NA as disclosed herein). The coatings are "catalyst coating compositions" or "catalyst coatings." The terms "catalyst composition" and "catalyst coating composition" are synonymous. A LNT catalyst coating comprises the LNT as described herein in the form of a composition, which may include additional components. A LT-NA catalyst coating comprises the LT-NA as described herein in the form of a composition, which may include additional components. LNT and LT-NA catalyst compositions may be prepared using a binder, for example, a ZrO$_2$ binder derived from a suitable precursor, such as zirconyl acetate, or any other suitable zirconium precursor, such as zirconyl nitrate. Zirconyl acetate binder provides a coating that remains homogeneous and intact after thermal aging, for example, when the catalyst is exposed to high temperatures of at least about 600° C., for example, at about 800° C. and higher, with water vapor environments of about 5% or more. Other potentially suitable binders include, but are not limited to, alumina and silica. Alumina binders include aluminum oxides, aluminum hydroxides, and/or aluminum oxyhydroxides. Aluminum salts and colloidal forms of alumina many also be used. Silica binders include various forms of SiO$_2$, including silicates and/or colloidal silica. Binder compositions may include any combination of zirconia, alumina, and/or silica. Other example binders include boehemite, gamma-alumina, and/or delta/theta alumina, as well as silica sol. When present, the binder is typically used in an amount of about 1 wt. % to about 5 wt. % of the total washcoat loading. Alternatively, the binder can be zirconia-based or silica-based, for example zirconium acetate, zirconia sol, or silica sol. When present, the alumina binder is typically used in an amount of about 0.05 g/in$^3$ to about 1 g/in$^3$. In some embodiments, the binder includes alumina.

As disclosed herein above, a substrate is coated with a catalytic (e.g., LNT or LT-NA) composition to form a catalytic article. The catalytic coating may comprise one or more thin, adherent coating layers disposed on and in adherence to least a portion of a substrate. In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The catalytic coating layer(s) may comprise the individual functional components, that is, the LNT and LT-NA compositions as described herein.

A catalyst composition may typically be applied in the form of a washcoat. A washcoat is formed by preparing a slurry containing a specified solids content (e.g., about 10% to about 60% by weight) in a liquid vehicle, which is then applied to a substrate and dried and calcined to provide a coating layer. If multiple coating layers are applied, the substrate is dried and calcined after each layer is applied and/or after a number of desired multiple layers are applied. In one or more embodiments, the catalytic material(s) are applied to the substrate as a washcoat. Binders may also be employed as described above.

The above-noted catalyst composition(s)(e.g., LNT and LT-NA) may be independently mixed with water to form a slurry for purposes of coating a catalyst substrate, such as a honeycomb-type substrate. In addition to the catalyst particles, the slurry may optionally contain a binder (e.g., alumina, silica), water-soluble or water-dispersible stabilizers, promoters, associative thickeners, and/or surfactants (including anionic, cationic, non-ionic or amphoteric surfactants). In some embodiments, a pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20 wt. % to about 60 wt. %, such as about 20 wt. % to about 40 wt. %. In one embodiment, the post-milling slurry is characterized by a D90 particle size of about 10 microns to about 40 microns. For example, the D90 particle size may be about 10 microns to about 30 microns, or about 10 microns to about 15 microns.

The slurry is then coated on the catalyst substrate using any suitable washcoat technique. In one embodiment, the catalyst substrate is dipped one or more times in the slurry or otherwise coated with the slurry. Thereafter, the coated substrate is dried at an elevated temperature (e.g., about 100° C. to about 150° C.) for a period of time (e.g., about 10 min to about 3 hours), and then calcined by heating, e.g., at about 400° C. to about 600° C., for example, for about 10 minutes to about 3 hours. Following drying and calcining, the final washcoat coating layer can be viewed as substantially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness. For example, more than one washcoat may be applied.

Coating Configurations

The washcoat(s) comprising the LNT and LT-NA compositions as disclosed herein can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may be "zoned", comprising zoned catalytic layers. This may also be described as "laterally zoned". For example, a layer may extend from the inlet end towards the outlet end extending about 20%, about 30%, about 40%, about 50%, about 60%, about 70%, or about 80% of the substrate length. Another layer may extend from the outlet end towards the inlet end extending about 20%, about 30%, about 40%, about 50%, about 60%, about 70%, or about 80% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60%, or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Zones of the present disclosure are defined by the relationship of coating layers. With respect to different coating layers, there are a number of possible zoning configurations. For example, there may be an upstream zone and a downstream zone, there may be an upstream zone, a middle zone, and a downstream zone, or there may have four different zones, etc. Where two layers are adjacent and do not overlap, there are upstream and downstream zones. Where two layers overlap to a certain degree, there are upstream, downstream, and middle zones. Where for example, a coating layer extends the entire length of the substrate, and a different coating layer extends from the outlet end for a certain length, and overlays a portion of the first coating layer, there are upstream and downstream zones. The present catalytic coatings may comprise more than one identical layer.

In some embodiments, the LNT is disposed on a first substrate, and the LT-NA is disposed on a second substrate. In some embodiments, the first substrate is a honeycomb substrate in the form of a flow-through filter, and the second substrate is a honeycomb substrate in the form of a flow-through filter or a wall-flow filter.

In some embodiments, the LNT and LT-NA are disposed on a substrate (e.g., on the same substrate) in a zoned configuration, the substrate having an inlet end and an outlet end defining an overall length, wherein the LNT is disposed on the substrate extending from the inlet end to a length of from about 20% to about 100% of the overall length; and wherein the LT-NA is disposed on the substrate extending from the outlet end to a length of from about 20% to about 100% of the overall length. In some embodiments, the "overall length" refers to the entire length of the substrate, in which case it is also referred to as and interchangeable with "substrate length". In some embodiments, the "overall length" can also refer to a certain portion of the entire length of the substrate that is coated with one or more coating layers as discussed herein. In some embodiments, the substrate is a honeycomb substrate in the form of a flow-through filter. FIGS. 3A, 3B, 3C, and 3D illustrate some embodiments of various zoned coating layer configurations with two coating layers (e.g., LNT and LT-NA coating layers) on a substrate (e.g., a flow-through filter substrate) as described herein according to this embodiment. Configurations of such coating layers are not limited. FIGS. 3A, 3B, 3C, and 3D illustrate monolithic wall-flow or flow-through filter substrate walls 200 onto which coating layers 201 (e.g., LNT, also referred to as LNT coating layer 201) and 202 (e.g., LT-NA, also referred to as LT-NA coating layer 202) are disposed. The monolithic wall-flow or flow-through filter substrates have an inlet "upstream" end 102 and an outlet "downstream" end 103. It is to be understood that the various zoned coating layer configurations as illustrated in FIGS. 3A, 3B, 3C, and 3D can also be applied to porous wall-flow substrates, even though the pores, coatings in adherence to pore walls, and plugged ends are not directly shown in these figures.

Figure 3A:
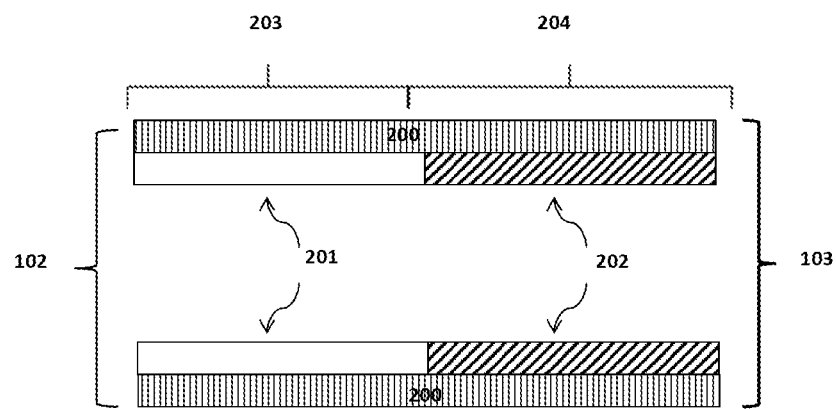
FIG. 3A depicts a cross-sectional view of a section of a substrate where the LNT and LT-NA are disposed on the same substrate in a zoned configuration in accordance with some embodiments of the present disclosure.

In some embodiments, the LNT coating layer is disposed directly on the substrate, and the LT-NA coating layer is disposed directly on the substrate (for example, there is no overlap between the LNT and LT-NA coating layers). FIG. 3A illustrates such an embodiment. Referring to FIG. 3A, coating layer 201 (e.g., the LNT) extends from inlet end 102 to the outlet for a length of about 50% of the substrate length, and coating layer 202 (e.g., the LT-NA) extends from outlet end 103 to the inlet for a length of about 50% of the substrate length. As shown in FIG. 3A, the coating layers are adjacent each other, providing an inlet (upstream) LNT zone 203 and an outlet (downstream) LT-NA zone 204. In some embodiments, the LNT coating layer is disposed on the substrate extending from inlet end 102 to a length of about 20% of the overall length, and the LT-NA coating layer is disposed on the substrate extending from outlet end 103 to a length of about 80% of the overall length. In some embodiments, the LNT coating layer is disposed on the substrate extending from inlet end 102 to a length of about 30% of the overall length, and the LT-NA coating layer is disposed on the substrate extending from outlet end 103 to a length of about 70% of the overall length. In some embodiments, the LNT coating layer is disposed on the substrate extending from inlet end 102 to a length of about 40% of the overall length, and the LT-NA coating layer is disposed on the substrate extending from outlet end 103 to a length of about 60% of the overall length. In some embodiments, the LNT coating layer is disposed on the substrate extending from inlet end 102 to a length of about 50% of the overall length, and the LT-NA coating layer is disposed on the substrate extending from outlet end 103 to a length of about 50% of the overall length. In some embodiments, the LNT coating layer is disposed on the substrate extending from inlet end 102 to a length of about 60% of the overall length, and the LT-NA coating layer is disposed on the substrate extending from outlet end 103 to a length of about 40% of the overall length. In some embodiments, the LNT coating layer is disposed on the substrate extending from inlet end 102 to a length of about 70% of the overall length, and the LT-NA coating layer is disposed on the substrate extending from outlet end 103 to a length of about 30% of the overall length. In some embodiments, the LNT coating layer is disposed on the substrate extending from inlet end 102 to a length of about 80% of the overall length, and the LT-NA coating layer is disposed on the substrate extending from outlet end 103 to a length of about 20% of the overall length.

Figure 3B:
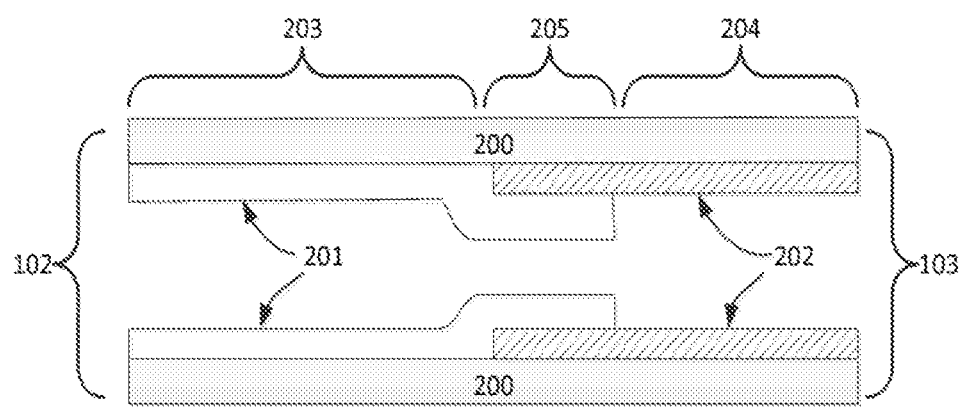
FIG. 3B depicts a cross-sectional view of a section of a substrate where the LNT and LT-NA are disposed on the same substrate in a partially overlapping zoned configuration in accordance with some embodiments of the present disclosure.

In some embodiments, the LNT coating layer partially overlaps the LT-NA coating layer (e.g., the LNT is disposed on at least a portion of the LT-NA). Such a configuration is depicted in FIG. 3B. Referring to FIG. 3B, coating layer 202 (e.g., the LT-NA) extends from outlet end 103 to about 50% of the substrate length, and layer 201 (e.g., the LNT) extends from inlet end 102 to greater than about 50% of the overall length, and overlays a portion of layer 202, providing an upstream LNT zone 203, a middle LNT zone 205, and a downstream LT-NA zone 204. In some embodiments, the LNT coating layer is disposed on the substrate extending from inlet end 102 to a length of about 20%, about 25%, about 30%, about 35%, about 40%, about 45%, about 50%, about 55%, about 60%, about 65%, about 70%, about 75%, or about 80% of the overall length, and the LT-NA coating layer is disposed on the substrate extending from outlet end 103 to a length of about 20%, about 25%, about 30%, about 35%, about 40%, about 45%, about 50%, about 55%, about 60%, about 65%, about 70%, about 75%, or about 80% of the overall length. For example, in a non-limiting embodiment, the LNT coating layer 201 is disposed on the substrate extending from inlet end 102 to a length of about 80% of the substrate length, and the LT-NA coating layer 202 is disposed on the substrate extending from outlet end 103 to a length of about 50% of the overall length. As such, the LNT coating layer overlaps about 30% of the LT-NA coating layer. One of skill will recognize that many configurations involving overlap are encompassed within the present disclosure; accordingly, all reasonable and functional percentages of overlap are covered within the scope of the present disclosure.

Figure 3C:
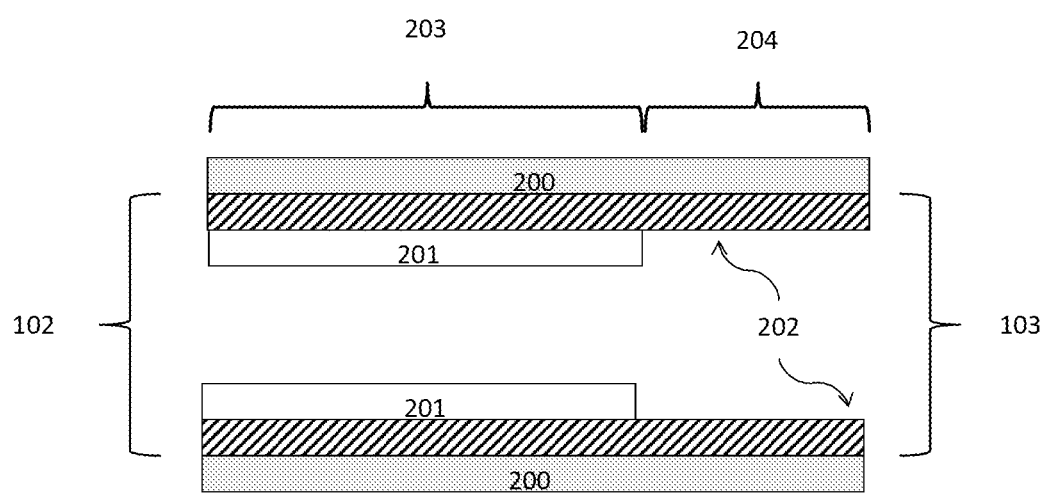
FIG. 3C depicts a cross-sectional view of a section of a substrate where the LNT and LT-NA are disposed on the same substrate in a layered and zoned configuration in accordance with some embodiments of the present disclosure.

In some embodiments. LT-NA coating layer 202 is disposed directly on the substrate covering 100% of the overall length; and LNT coating layer 201 is disposed on LT-NA coating layer 202, covering from about 20% to about 80% of the overall length. This layered configuration also provides upstream and downstream zones, as shown in a non-limiting embodiment in FIG. 3C. Referring to FIG. 3C, LT-NA coating layer 202 extends the entire length of the substrate, with LNT coating layer 201 partially overlaying LT-NA coating layer 202, forming an upstream LNT zone 203 and a downstream LT-NA zone 204. In some embodiments, the LNT coating layer is disposed on the substrate extending from inlet end 102 to a length of about 20%, about 25%, about 30%, about 35%, about 40%, about 45%, about 50%, about 55%, about 60%, about 65%, about 70%, about 75%, or about 80% of the overall length.

Figure 3D:
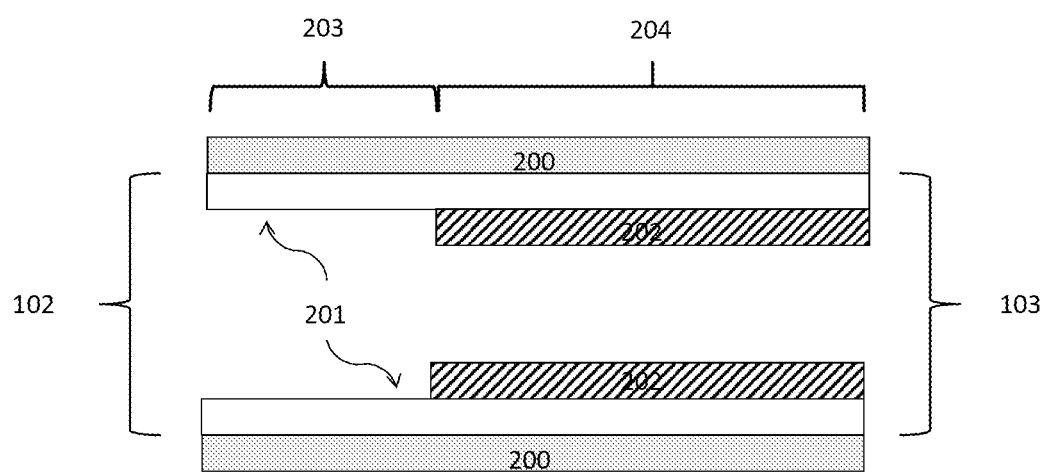
FIG. 3D depicts a cross-sectional view of a section of a substrate where the LNT and LT-NA are disposed on the same substrate in an alternate layered and zoned configuration in accordance with some embodiments of the present disclosure.

In some embodiments, LNT coating layer 201 is disposed directly on the substrate covering 100% of the overall length; and LT-NA coating layer 202 is disposed on LNT coating layer 201, covering from about 20% to about 80% of the overall length. This alternative layered configuration also provides upstream and downstream zones, as shown in a non-limiting embodiment in FIG. 3D. Referring to FIG. 3D, LNT coating layer 201 extends the entire length of the substrate, with LT-NA coating layer 202 partially overlaying LNT coating layer 201, forming an upstream LNT zone 203 and a downstream LT-NA zone 204. In some embodiments, the LT-NA coating layer is disposed on the substrate extending from outlet end 103 to a length of about 20%, about 25%, about 30%, about 35%, about 40%, about 45%, about 50%, about 55%, about 60%, about 65%, about 70%, about 75%, or about 80% of the overall length.

Loading of the catalytic coatings on a substrate will depend on substrate properties, such as porosity and wall thickness. In some embodiments, wall-flow filter catalyst loading is lower than catalyst loadings on a flow-through substrate. Catalyzed wall-flow filters are disclosed, for instance, in U.S. Pat. No. 7,229,597, which is incorporated herein by reference in its entirety. The present LT-NA and LNT catalyst compositions are generally present on the substrate at a concentration of, for instance, from about 0.3 $g/in^3$ to about 5.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$, or about 1.0 $g/in^3$, to about 1.5 $g/in^3$, about 2.0 $g/in^3$, about 2.5 $g/in^3$, about 3.0 $g/in^3$, about 3.5 $g/in^3$, about 4.0 $g/in^3$, about 4.5 $g/in^3$, about 5.0 $g/in^3$, or about 5.5 $g/in^3$, based on the substrate. Concentration of a catalyst composition (e.g., the LNT and/or LT-NA compositions), or any other component, on a substrate refers to concentration per any one three-dimensional section or zone, for instance any cross-section of a substrate or of the entire substrate.

In some embodiments, the LNT is effective to remove reducing gases present during a rich condition, and is effective to prevent the reducing gases from entering the downstream LT-NA. As used herein, reducing gases refers to components present in the exhaust gas stream during a rich condition, and may include, for example, carbon monoxide (CO) and/or hydrocarbons (HC). By rich condition is meant that the air/fuel ratio (lambda; $\lambda$) is below 1. In some embodiments, $\lambda$ is from about 0.80 to about 0.995. In some embodiments, $\lambda$ is from about 0.90 to 0.95. The air/fuel ratio of the exhaust gas composition may be altered to provide a rich gaseous stream (rich condition) by a number of methods known to those of skill in the art. Controllers that periodically operate the lean burn engine in a rich mode, or more directly alter the air/fuel ratio of the exhaust stream can be used. For instance, the air/fuel ratio can be made rich by periodically operating the engine in a rich mode using well known engine management controls. Alternatively, the exhaust gas stream may be rendered rich by periodically metering a hydrocarbon (e.g., diesel fuel) into the exhaust gas stream upstream of the LNT. A rich gaseous exhaust stream may also be formed by adding CO and/or hydrogen ($H_2$) to the exhaust upstream of the LNT, which may be generated, for example, by treatment of a small quantity of hydrocarbon fuel in a partial oxidation reaction.

Emission Treatment System

Another embodiment is provided an emission treatment system for $NO_x$ abatement in an exhaust stream of a lean burn engine, the emission treatment system comprising a lean $NO_x$ trap (LNT) as disclosed herein, the LNT in fluid communication with and downstream from the lean burn engine; and a low-temperature $NO_x$ adsorber (LT-NA) as disclosed herein, the LT-NA in fluid communication with and downstream of the LNT.

The engine can be, e.g., a diesel engine which operates at combustion conditions with air in excess of that required for stoichiometric combustion, e.g. lean conditions. In some embodiments, the lean burn engine is a diesel engine. In other embodiments, the engine can be an engine associated with a stationary source (e.g., electricity generators or pumping stations).

In the present emission treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Emission treatment systems may contain more than one catalytic article positioned downstream from the engine in fluid communication with the exhaust gas stream. Emission treatment systems as disclosed herein may further comprise one or more additional components for the treatment of exhaust gas emissions from a diesel engine or a lean burn gasoline engine, such as a diesel oxidation catalyst (DOC), and/or a selective catalytic reduction (SCR) catalyst. The emission treatment system may also further comprise a soot filter component and/or additional catalyst components, although the relative placement of the various components of the emission treatment system can be varied. In some embodiments, the one or more additional components are chosen from a diesel oxidation catalyst (DOC), a soot filter (which can be catalyzed or uncatalyzed), a selective catalytic reduction (SCR) catalyst, an ammonia or ammonia precursor injection component, an ammonia oxidation catalyst (AMOX), and combinations thereof.

The diesel oxidation catalyst (DOC) component of the exhaust gas treatment system may be located, for example, upstream of the SCR component and/or soot filter. A suitable DOC catalyst component for use in the emission treatment system is able to effectively catalyze the oxidation of CO and HC to carbon dioxide ($CO_2$). In some embodiments, the oxidation catalyst is capable of converting at least 50% of the CO or HC component present in the exhaust gas.

In addition to treating the exhaust gas emissions via use of a DOC component, emission treatment systems may employ a soot filter for removal of particulate matter. The soot filter may be located upstream or downstream from the DOC. For example, the soot filter will be located downstream from the DOC. In some embodiments, the soot filter is a catalyzed soot filter (CSF). The CSF may comprise a substrate coated with washcoat particles containing one or more catalysts for burning trapped soot and or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of CO and unburned hydrocarbons and to some degree particulate matter. The soot burning catalyst can be an oxidation catalyst comprising one or more precious metal catalysts (e.g., platinum and/or palladium).

Emission treatment systems as disclosed herein may further comprise a selective catalytic reduction (SCR) component. The SCR component may be located upstream or downstream of the DOC and/or soot filter. A suitable SCR catalyst component for use in the emission treatment system is able to effectively catalyze the reduction of the $NO_x$ exhaust component at temperatures as high as about 650° C. In addition, the SCR must be active for reduction of $NO_x$ even under conditions of low load, which typically are associated with lower exhaust temperatures. In some embodiments, the catalyst article is capable of converting at least about 50% of the $NO_x$ (e.g., NO) component to $N_2$, depending on the amount of reductant added to the system. Another attribute for the SCR composition is that it possesses the ability to catalyze the reaction of $O_2$ with any excess $NH_3$ to form $N_2$, so that $NH_3$ is not emitted to the atmosphere. SCR catalyst compositions used in the emission treatment system should also have thermal resistance to temperatures greater than 650° C. Such high temperatures may be encountered during regeneration of the catalyzed soot filter. Suitable SCR catalyst compositions are described, for instance, in U.S. Pat. Nos. 4,961,917 and 5,516,497, each of which is hereby incorporated by reference in its entirety. In some embodiments, the emission treatment system further comprises an SCR catalyst article downstream of and in fluid communication with the LNT and LT-NA.

Figure 4:
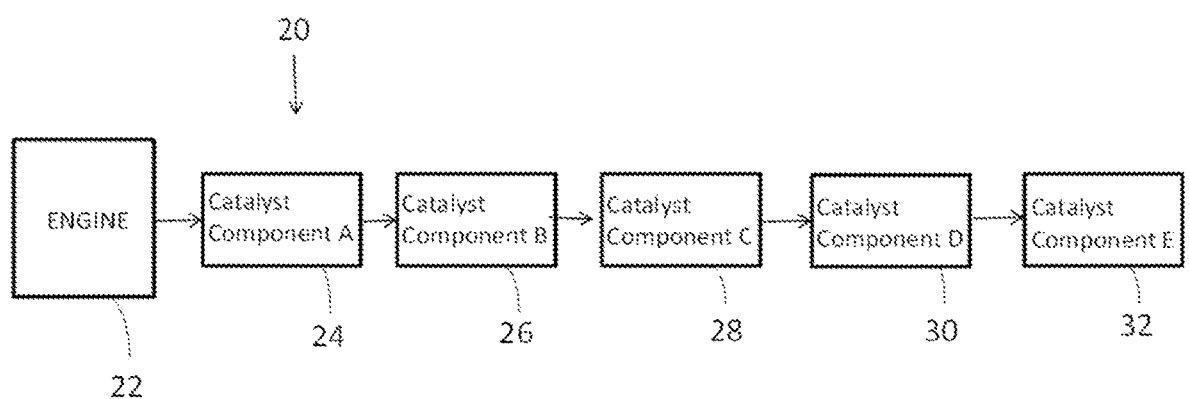
FIG. 4 illustrates a schematic depiction of an embodiment of an emission treatment system comprising the LNT and LT-NA, in combination with additional emission treatment system components.

One example emission treatment system is illustrated in FIG. 4, which depicts a schematic representation of a non-limiting exhaust gas treatment system 20, in accordance with embodiments of the present disclosure. As shown, emission treatment system 20 can include a plurality of catalyst components in series downstream of an engine 22, such as a lean burn gasoline engine. At least one of the catalyst components may be the LNT—LT-NA as set forth herein. FIG. 4 illustrates five catalyst components, 24, 26, 28, 30, 32 in series; however, the total number of catalyst components can vary and five components is merely one non-limiting example.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

Reference to SCR in the table refers to an SCR catalyst. Reference to SCRoF (or SCR on filter) refers to a particulate or soot filter (e.g., a wall flow filter). Reference to AMOx in the table refers to an ammonia oxidation catalyst, which can be provided downstream of an SCR to remove any slipped ammonia from the exhaust gas treatment system. As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst compositions mounted in a position near the engine (in a close-coupled position, CC), with additional catalyst compositions in a position underneath the vehicle body (in an underfloor position, UF). In one or more embodiments, the exhaust gas treatment system may further comprise an ammonia or ammonia precursor injection component. In some embodiments, the emission treatment system further comprises a lambda sensor disposed downstream of the LNT. In one or more embodiments, the lambda sensor is in communication with an on board diagnostic and/or engine control system. The lambda sensor used can be any suitable lambda sensor, for example, a heated exhaust gas oxygen (HEGO) or universal exhaust gas oxygen (UEGO) sensor.

TABLE 1

Possible exhaust gas treatment system configurations

| Component A | Component B | Component C | Component D | Component E |
|---|---|---|---|---|
| DOC | LNT - LT-NA | SCR | Optional AMOx | — |
| DOC | LNT - LT-NA | SCRoF | Optional AMOx | — |
| DOC | LNT - LT-NA | SCRoF | SCR | Optional AMOx |
| DOC | LNT - LT-NA | SCR | SCRoF | Optional AMOx |
| DOC | LNT - LT-NA | CSF | SCR | Optional AMOx |
| LNT - LT-NA | — | SCR | Optional AMOx | — |
| LNT - LT-NA | — | SCR | SCRoF | Optional AMOx |
| LNT - LT-NA | — | SCRoF | SCR | Optional AMOx |
| LNT - LT-NA | — | CSF | SCR | Optional AMOx |

Figure 5A:
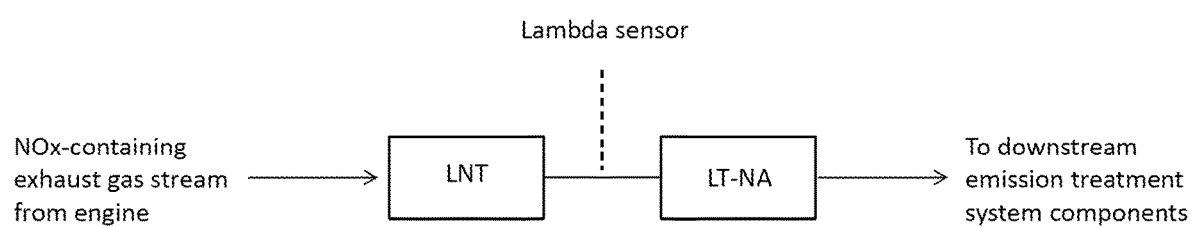
FIG. 5A illustrates a schematic depiction of an embodiment of an emission treatment system of the present disclosure comprising an LNT disposed on a first substrate and a LT-NA disposed on a second substrate, where the LNT is located downstream of and in fluid communication with a lean burn engine, and the LT-NA is located downstream of and in fluid communication with the LNT.
Figure 5B:
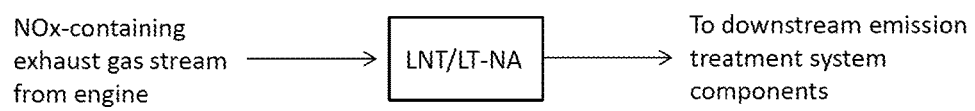
FIG. 5B illustrates a schematic depiction of an embodiment of an emission treatment system of the present disclosure comprising an LNT and a LT-NA, where the LNT is located downstream of and in fluid communication with a lean burn engine, and the LT-NA is located downstream of and in fluid communication with the LNT, and wherein the LNT and LT-NA are disposed on the same substrate.

To simplify depiction of the exhaust gas treatment system as disclosed herein, the LNT and LT-NA are illustrated as a single component A or B; however, this is a non-limiting embodiment. As described herein above, the LNT and LT-NA may each comprise a separate component (e.g., each may be disposed on a separate substrate), or may be combined on a single substrate, e.g., in a zoned or layered configuration, as a single component. Two exemplary configurations of the LNT and LT-NA are illustrated in FIG. 5A and FIG. 5B, which depict schematic representations of non-limiting configurations in accordance with embodiments of the present disclosure. Referring to FIG. 5A, the LNT and LT-NA are disposed on separate substrates and are present in the emission treatment system as two separate components. Referring to FIG. 51B, the LNT and LT-NA are disposed on the same substrate and/or are present in the emission treatment system as a single component.

Methods for Treating a Gaseous Exhaust Stream

Aspects of the current disclosure are directed toward a method for abating $NO_x$ in an exhaust stream from a lean burn engine, the method comprising contacting the exhaust gas stream with the emission treatment system of the present disclosure. In some embodiments, the method further comprises operating the lean burn engine in a rich mode for a period of time, producing a rich exhaust stream containing reducing gases comprising hydrocarbons (HC) and carbon monoxide (CO); passing the rich exhaust gas stream through the LNT, thereby creating a reducing atmosphere therein; and regenerating the LNT in the reducing atmosphere; wherein the period of time the lean burn engine is operated in the rich mode is sufficient to regenerate the LNT without exceeding the adsorption capacity of the LNT for the reducing gases. As used herein, "rich mode" refers to operating the lean burn engine under a less than stoichiometric air/fuel ratio (e.g., $\lambda<1$) such that the hydrocarbon fuel consumed by the engine is not fully combusted. This results in an exhaust stream containing unburned or partially burned hydrocarbons, referred to herein as a "rich condition" or "reducing condition." In contrast, "lean mode" refers to the normal, lean operation of the lean burn engine (e.g., $\lambda>1$). Operation in the rich mode is one method of producing a rich condition used to regenerate a LNT (e.g., a "deNO$_x$ pulse"). In the alternative, a deNO$_x$ pulse may be created by introducing hydrocarbons or other reducing gases (e.g., CO or H$_2$) into the exhaust stream by an injector downstream of the engine and upstream of one or more of the catalytic components.

As disclosed herein above, use of a LT-NA downstream of a LNT would normally be affected by the fact that the NO$_x$ adsorption capacity of the LT-NA would be deactivated by the rich condition deNO$_x$ pulse used to regenerate the LNT. However, by placing the LT-NA downstream of the LNT, and controlling the time period of the rich condition, the total quantity of the reducing gases contacting the LNT can be controlled. As such, the LT-NA can be protected from exposure to the reducing gases by the oxygen-storage function of the LNT. In some embodiments, when the exhaust gas stream is switched from the normal lean (oxidizing) condition to the rich (reducing) condition, there is a period of several seconds during which all reductant is consumed over the LNT by the oxygen-storage component (OSC). During this time, the effluent from the LNT, which enters the LT-NA, is stoichiometric (e.g., containing no O$_2$ or reductant). If composition and timing of this reducing pulse is controlled in such a way that there is no breakthrough of reductant from the LNT, then the downstream LT-NA is protected from the negative effect of the rich (e.g., reducing) deNO$_x$ pulse. In some embodiments, the timing of the deNO$_x$ pulse is controlled by monitoring the exhaust stream effluent from the LNT, and adjusting the air/fuel ratio responsively. Accordingly, in some embodiments, the method for abating NO$_x$ in an exhaust stream from a lean burn engine further comprises monitoring the exhaust stream exiting the LNT with a lambda sensor; and returning the lean burn engine to a lean mode, ending the period of time of operating the lean burn engine in the rich mode; thereby preventing exposure of the LNT to the reducing atmosphere. One of skill in the art will recognize the standard components and their integration into the engine management system to provide such control over the deNO$_x$ pulse.

The present systems and methods are suitable for treatment of exhaust gas streams from mobile emissions sources such as trucks and automobiles. The present systems and methods are also suitable for treatment of exhaust streams from stationary sources such as power plants.

EXAMPLE EMBODIMENTS

Without limitation, some embodiments of the present disclosure include:

1. An emission treatment system for NO$_x$ abatement in an exhaust stream of a lean burn engine, the emission treatment system comprising:
   a lean NO$_x$ trap (LNT) comprising an oxygen storage component (OSC) and a first platinum group metal (PGM) component, wherein the LNT is in fluid communication with and downstream from the lean burn engine; and
   a low-temperature NO$_x$ adsorber (LT-NA) comprising a molecular sieve comprising a second PGM component, wherein the LT-NA is in fluid communication with and downstream of the LNT.
2. The emission treatment system of Embodiment 1, wherein the LNT is disposed on a first substrate, and the LT-NA is disposed on a second substrate.
3. The emission treatment system of Embodiment 1 or 2, wherein the first substrate is a honeycomb substrate in the form of a flow-through filter, and the second substrate is a honeycomb substrate in the form of a flow-through filter or a wall-flow filter.
4. The emission treatment system of Embodiment 1, wherein the LNT and LT-NA are disposed on a substrate in a zoned configuration, and the substrate having an inlet end and an outlet end defining an overall length:
   wherein the LNT is disposed on the substrate extending from the inlet end to a length of from about 20% to about 100% of the overall length; and
   wherein the LT-NA is disposed on the substrate extending from the outlet end to a length of from about 20% to about 100% of the overall length.
5. The emission treatment system of Embodiment 4, wherein the LNT is disposed directly on the substrate covering 100% of the overall length; and the LT-NA is disposed on the LNT, covering from about 20% to about 80% of the overall length.
6. The emission treatment system of Embodiment 4, wherein the LT-NA is disposed directly on the substrate covering 100% of the overall length; and the LNT is disposed on the LT-NA, covering from about 20% to about 80% of the overall length.
7. The emission treatment system of Embodiment 4, wherein the LNT is disposed directly on the substrate, and the LT-NA is disposed directly on the substrate.
8. The emission treatment system of any one of Embodiments 4-7, wherein the substrate is a honeycomb substrate in the form of a flow-through filter.
9. The emission treatment system of any one of Embodiments 1-8, wherein the OSC comprises ceria.
10. The emission treatment system of Embodiment 9, wherein the OSC further comprises one or more chosen from zirconia, alumina, silica, titania, lanthana, baria, praseodymia, yttria, samaria, gadolinia, and combinations thereof.
11. The emission treatment system of any one of Embodiments 1-10, wherein the first PGM component is chosen from platinum, palladium, rhodium, and combinations thereof.
12. The emission treatment system of any one of Embodiments 1-11, wherein the first PGM component is palladium.
13. The emission treatment system of any one of Embodiments 1-12, wherein the second PGM component resides in ion-exchanged sites in the molecular sieve.
14. The emission treatment system of any one of Embodiments 1-13, wherein the second PGM component is chosen from platinum, palladium, rhodium, and combinations thereof.
15. The emission treatment system of any one of Embodiments 1-14, wherein the second PGM component comprises a mixture of platinum and palladium.
16. The emission treatment system of any one of Embodiments 1-15, wherein the molecular sieve has a framework type chosen from ABW, ACO, AEI, AEL, AEN, AET, AFG, AFI, AFN, AFO, AFR, AFS, AFT, AFX, AFY, AHT, ANA, APC, APD, AST, ASV, ATN, ATO. ATS. ATT, ATV, AVL, AWO, AWW, BCT, BEA, BEC, BIK, BOF, BOG, BOZ, BPH, BRE, BSV, CAN, CAS, CDO, CFI. CGF, CGS, CHA, CHI, CLO, CON, CZP, DAC, DDR, DFO, DFT, DOH, DON, EAB, EDI, EEI, EMT, EON, EPI, ERI, ESV, ETR, EUO, EZT, FAU, FER, FRA, GIS, GIU, GME, GON, GOO. HEU. IFR, IFY, IHW, IMF, IRN, ISV, ITE, ITG, ITH, ITW, IWR, IWS, IWV, IWW, JBW, JRY, JSR, JST, KFI, LAU, LEV, LIO, LIT, LOS, LOV, LTA, LTF, LTL, LTN, MAR, MAZ, MEI, MEL, MEP, MER, MFI, MFS, MON, MOR, MOZ. MRE, MSE, MSO, MTF, MTN, MTT, MVY, MTW, MWF, MWW, NAB, NAT, NES, NON, NPO. NPT, NSI, OBW, OFF, OKO, OSI, OSO, OWE, PAR, PAU, PCR, PHI, PON, PUN, RHO, RON, RRO, RSN, RTE, RTH, RUT, RWR, RWY, SAF, SAO, SAS, SAT, SAV, SBE. SBS, SBT, SCO, SEW, SFE. SFF, SFG, SFH, SFN, SFO, SFS, SFW, SGF, SGT, SIV, SOD, SOF, SOS, SSF, SSY, STF, STI, STO. STT, STW, SVR. SZR, TER, THO, TON, TSC, TUN, UEI, UFI, UOS, UOZ, USI, UTL, UWY, VET, VFI, VNI, VSV, WIE, WEN, YUG, ZON, and mixtures or intergrowths thereof.

17. The emission treatment system of any one of Embodiments 1-16, wherein the molecular sieve has a framework type chosen from AFX, CHA, and FER.

18. The emission treatment system of any one of Embodiments 1-17, wherein the molecular sieve is an aluminosilicate zeolite.

19. The emission treatment system of any one of Embodiments 1-17, wherein the molecular sieve is chosen from Type A, beta zeolite, chabazite, erionite, faujasite, ferrierite, mordenite, silicalite, SSZ-13, stilbite, ZSM-5, ZSM-11, ZSM-23, ZSM-48, zeolite X, and zeolite Y.

20. The emission treatment system of any one of Embodiments 1-19, wherein the molecular sieve is ferrierite.

21. The emission treatment system of any one of Embodiments 1-20, wherein the LNT is configured to remove reducing gases present during a rich condition; and wherein the LNT is configured to prevent the reducing gases from entering the downstream LT-NA.

22. The emission treatment system of any one of Embodiments 1-21, further comprising a lambda sensor disposed downstream of the LNT.

23. The emission treatment system of any one of Embodiments 1-22, further comprising one or more chosen from a selective catalytic reduction (SCR) catalyst, an ammonia or ammonia precursor injection component, a diesel oxidation catalyst (DOC), a catalyzed soot filter (CSF), an ammonia oxidation (AMOX) catalyst, and combinations thereof.

24. The emission treatment system of Embodiment 23, wherein the SCR is downstream of and in fluid communication with the LT-NA.

25. A method for abating $NO_x$ in an exhaust stream from a lean burn engine, the method comprising contacting the exhaust gas stream with the emission treatment system of any one of Embodiments 1-24.

26. The method of Embodiment 25, further comprising:
operating the lean burn engine in a rich mode that produces a rich exhaust stream containing reducing gases comprising hydrocarbons (HC) and carbon monoxide (CO);
passing the rich exhaust gas stream through the LNT, thereby creating a reducing atmosphere therein, and regenerating the LNT in the reducing atmosphere,
wherein the lean burn engine is operated in the rich mode to sufficiently regenerate the LNT without exceeding the adsorption capacity of the LNT for the reducing gases.

27. The method of Embodiment 26, further comprising:
monitoring the exhaust stream exiting the LNT with a lambda sensor; and
returning the lean burn engine to a lean mode to end operating the lean burn engine in the rich mode according to a monitoring result, thereby preventing exposure of the LT-NA to the reducing atmosphere.

It will be readily apparent to one of ordinary skill in the relevant arts that suitable modifications and adaptations to the compositions, methods, and applications described herein can be made without departing from the scope of any embodiments or aspects thereof. The compositions and methods provided are examples and are not intended to limit the scope of the embodiments. All of the various embodiments, aspects, and options disclosed herein can be combined in all variations. The scope of the compositions, formulations, methods, and processes described herein include all actual or potential combinations of embodiments, aspects, options, examples herein. All patents and publications cited herein are incorporated by reference herein for the specific teachings thereof as noted, unless other specific statements of incorporation are specifically provided.

What is claimed is:

1. An emission treatment system for $NO_x$ abatement in an exhaust stream of a lean burn engine, the emission treatment system comprising:
a lean $NO_x$ trap (LNT) comprising an oxygen storage component (OSC) and a first platinum group metal (PGM) component, wherein the LNT is in fluid communication with and downstream from the lean burn engine; and
a low-temperature $NO_x$ adsorber (LT-NA) comprising a molecular sieve comprising a second PGM component, wherein the LT-NA is in fluid communication with and downstream of the LNT,
wherein the LNT and LT-NA are disposed on a substrate in a zoned configuration, the substrate having an inlet end and an outlet end defining an overall length;
wherein the LNT is disposed on the substrate extending from the inlet end to a length of from about 20% to about 100% of the overall length; and
wherein the LT-NA is disposed on the substrate extending from the outlet end to a length of from about 20% to about 100% of the overall length.

2. The emission treatment system of claim 1, wherein the LNT is disposed on a first substrate, and the LT-NA is disposed on a second substrate.

3. The emission treatment system of claim 2, wherein the first substrate is a honeycomb substrate in the form of a flow-through filter, and the second substrate is a honeycomb substrate in the form of a flow-through filter or a wall-flow filter.

4. The emission treatment system of claim 1, wherein the LNT is disposed directly on the substrate covering 100% of the overall length; and the LT-NA is disposed on the LNT, covering from about 20% to about 80% of the overall length.

5. The emission treatment system of claim 1, wherein the LT-NA is disposed directly on the substrate covering 100% of the overall length; and the LNT is disposed on the LT-NA, covering from about 20% to about 80% of the overall length.

6. The emission treatment system of claim 1, wherein the LNT is disposed directly on the substrate, and the LT-NA is disposed directly on the substrate.

7. The emission treatment system of claim 1, wherein the substrate is a honeycomb substrate in the form of a flow-through filter.

8. The emission treatment system f claim 1, wherein the OSC comprises ceria.

9. The emission treatment system of claim 8, wherein the OSC further comprises one or more chosen from zirconia, alumina, silica, titanic, lanthana, baric, praseodymia, yttria, samaria, gadolinia, and combinations thereof.

10. The emission treatment system of claim 1, wherein the first PGM component is chosen from platinum, palladium, rhodium, and combinations thereof, and second PGM component is chosen from platinum, palladium, rhodium, and combinations thereof.

11. The emission treatment system of claim 1, wherein the second PGM component resides in ion-exchanged sites in the molecular sieve.

12. The emission treatment system of claim 1, wherein the molecular sieve has a framework type chosen from ABW, ACO, AEI, AEL, AEN, AET, AFG, AFI, AFN, AFG, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CR, CGF, CGS, CHA, CHI, CLO, CON, CZP, DAC, DDR, DFO, DFT, DOH, DON, EAB, EDI, EEI, EMT, EON, EPI, ERI, ESV, ETR, EUO, EZT, FAU, FER, FRA, GIS, GiU, GME, CON, GOO, HEU, IFR, IFY, IHW, IMF, IRN, ISV, ITE, ITG, ITH, ITW, IWR, IWS, IWV, IWW, JBW, JRY, JSR, JST, KR, LAU, LEV, LIO, LIT, LOS, LOV, LTA, LTF, LTL, LTN, MAR, MAZ, MEI, MEL, MEP, MER, MFI, MFS, MON, MOR, MOZ, MRE, MSE, MSO, MTF, MTN, MIT, MVY, MTW, MWF, MWW, NAB, NAT, NES, NON, NPO, NPT, NSI, OBW, OFF, OKO, OSI, OSO, OWE, PAR, PAU, PCR, PHI, PON, PUN, RHO, RON, RRO, RSN, RTE, RTH, RUT, RWR, RWY, SAF, SAO, SAS, SAT, SAV, SBE, SBS, SBT, SCO, SEW, SFE, SFF, SFO, SFH, SFN, SFO, SFS, SFW, SGF, SGT, SIV, SOD, SOF, SOS, SSF, SSY, STF, STI, STO, SIT, STW, SVR, SZR, TER, THO, TON, TSC, TUN, UEI, UR, UOS, UOZ, USI, UTL, UWY, VET, VFI, VNI, VSV, WIE, WEN, YUG, ZON, and mixtures or intergrowths thereof.

13. The emission treatment system of claim 1, wherein the molecular sieve is an aluminosilicate zeolite.

14. The emission treatment system of claim 1, wherein the molecular sieve is chosen from Type A, beta zeolite, chabazite, erionite, faujasite, ferrierite, mordenite, silicalite, SSZ-13, stilbite, ZSM-5, ZSM-11, ZSM-23, ZSM-48, zeolite X, and zeolite Y.

15. The emission treatment system of claim 1, wherein the LNT is configured to remove reducing gases present during a rich condition; and wherein the LNT is configured to prevent the reducing gases from entering the downstream LT-NA.

16. The emission treatment system of claim 1, further comprising a lambda sensor disposed downstream of the LNT.

17. The emission treatment system of claim 1, further comprising one or more chosen from a selective catalytic reduction (SCR) catalyst, an ammonia or ammonia precursor injection component, a diesel oxidation catalyst (DOC), a catalyzed soot filter (CSF), an ammonia oxidation (AMOX) catalyst, and combinations thereof.

18. The emission treatment system of claim 17, wherein the SCR catalyst is downstream of and in fluid communication with the LT-NA.

19. A method for abating $NO_x$ in an exhaust stream from a lean burn engine, the method comprising contacting the exhaust gas stream with the emission treatment system of claim 1.

20. The method of claim 19, further comprising:
operating the lean burn engine in a rich mode that produces a rich exhaust stream containing reducing gases comprising hydrocarbons (HC) and carbon monoxide (CO);
passing the rich exhaust gas stream through the LNT, thereby creating a reducing atmosphere therein; and
regenerating the LNT in the reducing atmosphere,
wherein the lean burn engine is operated in the rich mode to sufficiently regenerate the LNT without exceeding the adsorption capacity of the LNT for the reducing gases.

21. The method of claim 20, further comprising:
monitoring the exhaust stream exiting the LNT with a lambda sensor; and
returning the lean burn engine to a lean mode to end operating the lean burn engine in the rich mode according to a monitoring result, thereby preventing exposure of the LT-NA to the reducing atmosphere.

* * * * *